US011674066B2

(12) United States Patent
Vujcic et al.

(10) Patent No.: US 11,674,066 B2
(45) Date of Patent: Jun. 13, 2023

(54) PARTICULATE MATERIALS AND METHODS OF FORMING SAME

(71) Applicant: SAINT-GOBAIN CERAMICS & PLASTICS, INC., Worcester, MA (US)

(72) Inventors: Stefan Vujcic, Buffalo, NY (US); Ralph Bauer, Niagara Falls (CA)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/536,157

(22) Filed: Aug. 8, 2019

(65) Prior Publication Data
US 2020/0048517 A1    Feb. 13, 2020

Related U.S. Application Data

(60) Provisional application No. 62/717,441, filed on Aug. 10, 2018.

(51) Int. Cl.
C09K 3/14 (2006.01)
C04B 35/628 (2006.01)
(Continued)

(52) U.S. Cl.
CPC ............ C09K 3/1436 (2013.01); C01F 7/441 (2013.01); C04B 35/1115 (2013.01);
(Continued)

(58) Field of Classification Search
CPC ...... C09K 3/1436; C09K 3/1418; C09K 3/14; C09K 3/1409; C04B 35/6281; C04B 2235/3206; C04B 2235/85; C04B 2235/3217; C04B 35/1115; C04B 35/111; C04B 35/10; C01P 2004/54;
(Continued)

(56) References Cited

U.S. PATENT DOCUMENTS 3,079,242 A    2/1963 Glasgow
3,377,660 A    4/1968 Marshall
(Continued)

FOREIGN PATENT DOCUMENTS

KR    20000036182 A    6/2000
WO    1995018192 A1    7/1995
(Continued)

OTHER PUBLICATIONS

D. Monceau, C. Petot, G. Petot-Ervas, J.W. Fraser, M.J. Graham, G.I. Sproule, Surface segregation and morphology of Mg-doped α-alumina powders, Journal of the European Ceramic Society, vol. 15, Issue 9, 1995, pp. 851-858, doi:10.1016/0955-2219(95)00050-5 (Year: 1995).*

(Continued)

Primary Examiner — Kevin E Yoon
Assistant Examiner — Marites A Guino-O Uzzle
(74) Attorney, Agent, or Firm — Abel Schillinger, LLP; Adrian Lawrence

(57) ABSTRACT

A particulate material having a body including a dopant contained in the body, the dopant is non-homogenously distributed throughout the body and the body has a maximum normalized dopant content difference of at least 35%.

20 Claims, 9 Drawing Sheets

(51) Int. Cl.
*C01F 7/441* (2022.01)
*C04B 35/111* (2006.01)

(52) U.S. Cl.
CPC ........ *C04B 35/6281* (2013.01); *C09K 3/1409* (2013.01); *C01P 2002/52* (2013.01); *C01P 2002/54* (2013.01); *C01P 2004/20* (2013.01); *C04B 2235/3206* (2013.01); *C04B 2235/3217* (2013.01); *C04B 2235/85* (2013.01); *C09K 3/1418* (2013.01)

(58) Field of Classification Search
CPC .............. C01P 2004/20; C01P 2004/61; C01P 2004/62; C01P 2002/54; C01P 2002/52; C01F 7/441; C09G 1/02; B24D 3/00; B24D 3/02

See application file for complete search history.

(56) References Cited

U.S. PATENT DOCUMENTS

| | | | |
|---|---|---|---|
| 3,758,328 A * | 9/1973 | Kirchner et al. | C04B 35/10 427/253 |
| 4,744,802 A | 5/1988 | Schwabel | |
| 4,848,041 A | 7/1989 | Kruschke | |
| 5,164,348 A * | 11/1992 | Wood | C04B 41/4584 501/127 |
| 5,201,916 A | 4/1993 | Berg | |
| 5,366,523 A | 11/1994 | Rowenhorst | |
| 5,785,722 A | 7/1998 | Garg | |
| 5,893,935 A | 4/1999 | Wood | |
| 5,984,988 A | 11/1999 | Berg | |
| 6,083,622 A * | 7/2000 | Garg | C09K 3/1409 428/402 |
| 6,206,942 B1 | 3/2001 | Wood | |
| 6,929,199 B1 | 8/2005 | Garg | |
| 2013/0180180 A1* | 7/2013 | Yener | C04B 35/64 51/309 |
| 2015/0000209 A1* | 1/2015 | Louapre | C09K 3/1409 51/309 |
| 2015/0175864 A1 | 6/2015 | Takahashi et al. | |
| 2015/0218430 A1* | 8/2015 | Yener | C04B 35/1115 51/309 |
| 2016/0340564 A1* | 11/2016 | Louapre | C09K 3/1427 |

FOREIGN PATENT DOCUMENTS

| | | |
|---|---|---|
| WO | 96-32226 A2 | 10/1996 |
| WO | 98-12152 A1 | 3/1998 |
| WO | 2013102170 A1 | 7/2013 |
| WO | 2014106173 A1 | 7/2014 |

OTHER PUBLICATIONS

International Search Report and Written Opinion with regard to International Application No. PCT/US2019/045779, dated Nov. 27, 2019.

* cited by examiner

PARTICULATE MATERIALS AND METHODS OF FORMING SAME

CROSS-REFERENCE TO RELATED APPLICATION

This application claims priority under 35 U.S.C. § 119(e) to U.S. Provisional Application No. 62/717,441, entitled "PARTICULATE MATERIALS AND METHODS OF FORMING SAME," by Stefan VUJCIC, et al., filed Aug. 10, 2018, which is assigned to the current assignee hereof and is incorporated herein by reference in its entirety.

BACKGROUND

Field of the Disclosure

The following is directed to particulate materials, such as, particulate materials including a dopant that is non-homogeneously distributed through the body.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, disclosing a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of up to 10 micrometers in diameter. Binders can be added to the powders along with a lubricant and a suitable solvent, e.g., water. The resulting mixtures, mixtures, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive particles are produced directly to size.

Chemical ceramic technology involves converting a colloidal dispersion or hydrosol (sometimes called a sol), optionally in a mixture, with solutions of other metal oxide precursors, to a gel or any other physical state that restrains the mobility of the components, drying, and firing to obtain a ceramic material. See, for example, U.S. Pat. Nos. 4,744,802 and 4,848,041.

SUMMARY

According to one aspect, the description includes a method of forming an abrasive particulate comprising comminuting a particulate precursor, impregnating the particulate precursor, and conducting an enriching process and selectively depositing the dopant in higher concentrations in an enriched region of the body of the abrasive particulate compared to a doped region associated with a central region of the body.

In another aspect, the description includes an abrasive particulate comprising a body and a dopant contained in the body, wherein the dopant is non-homogenously distributed throughout the body and wherein the body comprises a maximum normalized dopant content difference of at least 35%.

In still another aspect, the description includes an abrasive particulate comprising a body and a dopant contained in the body, wherein the dopant is non-homogenously distributed throughout the body and defines the following regions in the body: a) an enriched region abutting an exterior surface of the body and having a first dopant content; b) a doped region in a central region of the body and different than the enriched region, the doped region having a second dopant content; and c) a depletion region between the enriched region and doped region, the depletion region defining a decrease in the normalized content of the dopant of greater than 0.04%/nm.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to abrasive particulates and methods of forming abrasive particulates. The abrasive particulates may be used in a variety of applications, including but not limited to, free abrasive applications (e.g., grinding or polishing slurries) or fixed abrasive applications, including for example coated abrasives, bonded abrasives, nonwoven abrasives, and the like.

Figure 1:
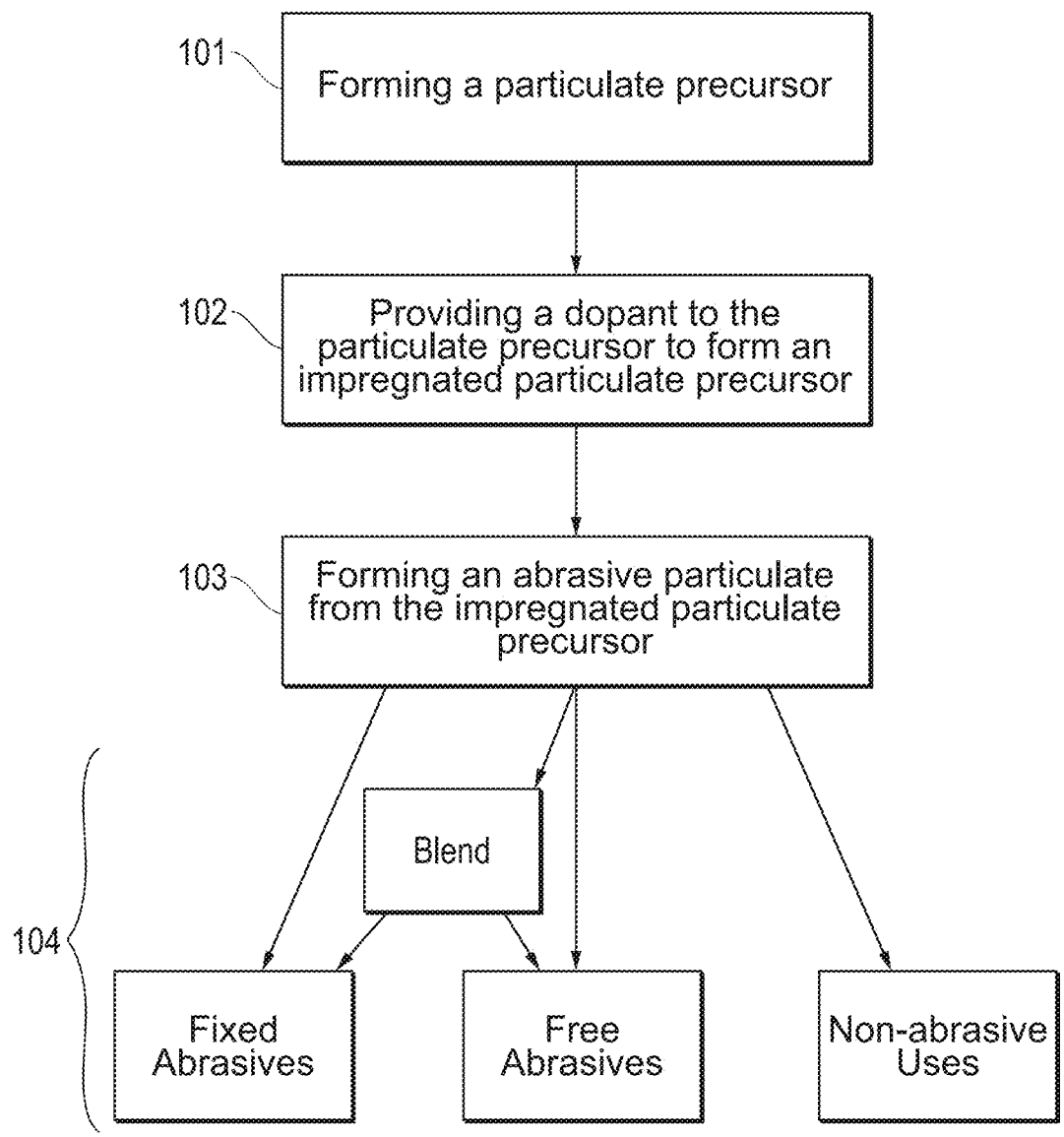
FIG. 1 includes a flowchart illustrating a process of forming a particulate material in accordance with an embodiment.

FIG. 1 includes a flowchart for a method of forming an abrasive particulate according to an embodiment. As illustrated in FIG. 1, the process is initiated at step 101 by forming a particulate precursor. Suitable processes for forming a particulate precursor can include a variety of processes including but not limited to hydrothermal treatment, seeded sol gel processes, chemical reactions, and the like.

Forming the particulate precursor may start with a raw material powder. In at least one embodiment, the raw material powder can be a material selected from the group of oxides, carbides, nitrides, borides, oxycarbides, oxynitrides, oxyborides, and combination thereof. In certain instances, the raw material powder may include an oxide. Furthermore, the raw material powder may include alumina. In one embodiment, the raw material powder may include a hydrated alumina. In another embodiment, the raw material powder may include alpha alumina.

As noted herein, the raw material powder can included a seeded material, such as material processed through a seeded processing pathway. That is, for example, the raw material may be include a seed material, which may be a compound, complex, or element configured to control the growth of particular crystalline phases within the raw material powder. The seeded raw material powder may include a minority content of seed material, which may facilitate the formation of particular crystalline phases during further processing of the raw material powder. One non-limiting seeded processing pathway is described herein. In other instances, the raw material powder may include an unseeded material, and can be essentially free of seed material.

Providing a raw material powder can include synthesis of a particulate material by obtaining an aluminous raw material. While certain aluminous raw materials can be sourced commercially, in other instances, the aluminous raw material may be manufactured. In accordance with an embodiment, the process of forming can include processes such as, dispersing, mixing, gelling, seeding, calcining, shaping, printing, molding, extruding, pressing, drying, crushing, sieving, sorting, and a combination thereof.

As noted herein, the raw material powder may be obtained by manufacturing the powder, including for example, manufacturing an aluminous raw material according to a seeded pathway. In one embodiment, the aluminous raw material can include a boehmite precursor and boehmite seeds in a suspension (alternatively sol or slurry), that can be heat-treated (such as by hydrothermal treatment) to convert the boehmite precursor into boehmite particulate material formed of particles or crystallites. The term "boehmite" is generally used herein to denote alumina hydrates including mineral boehmite, typically being Al2O3·H2O and having a water content on the order of 15%, as well as pseudoboehmite, having a water content higher than 15%, such as 20-38% by weight. It is noted that boehmite (including pseudoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

After forming a suitable boehmite particulate material, a heat treatment process can be carried out to effect polymorphic transformation, which removes water and forms an alumina material. According to one aspect, the boehmite particulate material can have a relatively elongated morphology, described generally herein in terms of primary (and also secondary and tertiary) aspect ratio.

Primary aspect ratio is defined as the ratio of the longest dimension to the next longest dimension perpendicular to the longest dimension and is generally not less than 2:1, and preferably not less than 3:1, 4:1, or 6:1. With particular reference to needle-shaped particles, the particles may be further characterized with reference to a secondary aspect ratio defined as the ratio of the second longest dimension to the third longest dimension. The secondary aspect ratio is generally not greater than 3:1, typically not greater than 2:1, or even 1.5:1, and often times about 1:1. The secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

Alternatively, the boehmite particulate material can have a platy or platelet-shaped contour, generally have an elongated structure having the primary aspect ratios described above in connection with the needle-shaped particles. However, platelet-shaped particles generally have opposite major surfaces, the opposite major surfaces being generally planar and generally parallel to each other. In addition, the platelet-shaped particles may be characterized as having a secondary aspect ratio greater than that of needle-shaped particles, generally not less than about 3:1, such as not less than about 6:1, or even not less than 10:1.

The morphology of the boehmite particulate material formed through a seeding process can have a relatively fine particle size. Generally, the average boehmite material particle size is not greater than about 100 nanometers, and falls within a range of about 10 to 100 nanometers. Other embodiments have even finer average particle sizes, such as not greater than about 80 nanometers, 75 nanometers, 60 nanometers, 50 nanometers, 40 nanometers, and even particles having an average particle size smaller than 30 nanometers, representing a fine particulate material. As used herein, the "average particle size" in connection with high aspect ratio boehmite particulate material is used to denote the average longest dimension of the particles.

In addition to aspect ratio and average particle size of the boehmite particulate material, morphology of the boehmite particulate material may be further characterized in terms of specific surface area. Here, a BET technique was utilized to measure specific surface area of the boehmite particulate material. According to embodiments herein, the boehmite particulate material may have a relatively high specific surface area, generally not less than about 10 $m^2/g$, such as not less than about 50 $m^2/g$, 70 $m^2/g$, or not less than about 90 $m^2/g$. Since specific surface area is a function of particle morphology as well as particle size, generally the specific surface area of embodiments was less than about 400 $m^2/g$, such as less than about 350 or 300 $m^2/g$. Specific ranges for surface area are about 75 $m^2/g$ to 200 $m^2/g$.

Turning to the details of the processes by which the seeded boehmite particulate material may be manufactured, generally ellipsoid, needle, or platelet-shaped boehmite are formed from a boehmite precursor, typically an aluminous material including bauxitic minerals, by hydrothermal treatment as generally described in the commonly owned patent described above, U.S. Pat. No. 4,797,139. More specifically, the boehmite particulate material may be formed by combining the boehmite precursor and boehmite seeds in suspension, exposing the suspension (alternatively sol or slurry) to heat treatment to cause conversion of the raw material into boehmite particulate material, further influenced by the boehmite seeds provided in suspension. Heating is generally carried out in an autogenous environment, that is, in an autoclave, such that an elevated pressure is generated during processing. The pH of the suspension is generally selected from a value of less than 7 or greater than 8, and the boehmite seed material can have a particle size finer than about 0.5 microns. Generally, the seed particles are present in an amount greater than about 1% by weight of the boehmite precursor (calculated as $Al_2O_3$), and heating is carried out at a temperature greater than about 120° C., such as greater than about 125° C., or even greater than about 130° C., and at a pressure that is autogenously generated, typically around 30 psi.

Following heat treatment, such as by hydrothermal treatment, and boehmite conversion, the liquid content is generally removed, such as through an ultrafiltration process or by heat treatment to evaporate the remaining liquid. It is noted that the particulate size described herein generally describes the individual particles formed through processing, rather than the aggregates which may remain in certain embodiments (e.g., for those products that call for an aggregated material).

Certain processing variables may be modified during the formation of the boehmite particulate material, to affect the desired morphology. These variables include the weight ratio, that is, the ratio of boehmite precursor to boehmite seed, the particular type or species of acid or base used during processing (as well as the relative pH level), and the temperature (which is directly proportional to pressure in an autogenous hydrothermal environment) of the system.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

After forming the boehmite particulate material, the process can further include heat-treatment of the boehmite particulate material to form an aluminous material as the particulate precursor. The heat-treatment may include calcination of the boehmite particulate material at a temperature sufficient to cause transformation into a particular phase of alumina (e.g., gamma, delta, theta, alpha) or combination of phases of alumina providing a suitable aluminous material. For purposes of clarification, an aluminous material is one that comprises a majority content (wt %) of alumina ($Al_2O_3$) and preferably, at least about 80 wt %, at least 90 wt %, at least 95 wt % or even consisting essentially of alumina. Still, the boehmite particulate material may be used for other processes before heat-treatment, including for example the provision of an additive, which is described in more detail herein.

The process of calcination can include heating the precursor particulate to a temperature suitable to remove particular volatile components and facilitate the formation of a porous material. In one particular instance, the process of calcining can be conducted at a temperature of at least about 300° C. In other instances, the calcining temperature may be greater, such as at least about 600° C., at least about 700° C., or even at least about 750° C. Still, the process of calcining may be conducted at a temperature not greater than about 1200° C., such as not greater than about 1000° C. or even not greater than about 900° C. It will be appreciated that the process of calcining can be conducted at a temperature within a range between any of the minimum and maximum values noted above.

In certain instances, prior to, during or even after partial calcination, the precursor particulate can be explosively comminuted. Explosive comminution comprises feeding a dried or partially calcined, but not fired, material having a volatilizable content of at least 5% by weight, directly into a furnace held at a temperature above 400° C. and controlling the temperature and residence time to produce an explosively comminuted material. Under certain conditions when the temperature and duration are properly controlled the volatile material in the particulate is vaporized rapidly to cause fracturing of the particulate. Such a process may create randomly shaped abrasive particulates having one or more distinctive shape features, such as sharpness and aspect ratio, compared to other abrasive particles formed through other comminution techniques.

Referring again to FIG. 1, after step 101, the process can continue at step 102 by providing a dopant (e.g., an additive) to the particulate precursor to form an impregnated particulate precursor. In accordance with an embodiment, the process of including a dopant can include an impregnation process, which may include providing the dopant into pores of the particulate precursor. The porosity of the particulate precursor may be obtained through natural or artificial processes. For example, calcining may facilitate the formation of a porous raw material powder, and thereafter, the dopant may be added to the calcined and porous particulate precursor to facilitate impregnation.

In certain instances, the process of impregnating can include saturation of the porosity of the particulate powder with the dopant. Saturation can include filling at least a portion of the pore volume of the particulate precursor with the dopant. Still, a saturation process may include filling a majority of the porosity with the dopant, and more particularly, may include filling substantially all of the total pore volume of the particulate precursor with the dopant.

In certain instances, the dopant can include more than one component. For example, the dopant may be made of one or more precursors or components, which through later processing will form the desired dopant material in the finally-formed abrasive particulate. In accordance with an embodiment, the dopant or first component may include one or more of an alkali element, alkaline earth element, transition metal element, a rare earth element or any combination thereof. More specifically, the dopant can include an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, cerium, neodymium, gadolinium. europium, silicon, phosphorous or any combination thereof. According to one embodiment, the dopant comprises magnesium, and may consist essentially of magnesium or magnesium oxide. Magnesium or magnesium oxide may not necessarily be impregnated directly into the precursor particulate, and instead the dopant or first component may include a salt, and may be present as a solution including the dopant. For example, the first component may include a salt solution. In one particular embodiment, the first component may include magnesium (Mg), and more particularly, may include magnesium salt, such as magnesium chloride, magnesium nitrate, magnesium acetate or the like.

The dopant may include, but need not necessarily include, a second component distinct from the first component. For example, the second component may include an alkali element, alkaline earth element, transition metal element, a rare earth element or any combination thereof.

The process of impregnating the precursor particulate with the dopant (or the one or more dopant components) can include exposing the precursor particulate to the dopant. For example, the precursor particulate can be deposited into a solution containing the dopant to facilitate impregnation of the dopant into the pores of the precursor particulate. The duration and temperature of the impregnation process can be controlled to facilitate impregnation of the dopant into the precursor particulate.

Optionally, one or more enriching processes may be utilized with the impregnation process or in addition to the impregnation process to facilitate the formation of an abrasive particulate having certain features described in the embodiments herein. For example, the abrasive particulate of the embodiments herein can have an enriched region, which can be abutting the exterior surface of the particle and contains a significantly greater content of the dopant compared to other regions within the body of the abrasive particulate. Without wishing to be held to a particular theory, it is thought that the particular non-homogeneous distribution of dopant throughout the body created by the processes herein may facilitate improved performance of the abrasive particulate and associated abrasive articles. Enriching processes that may facilitate the formation of the particular non-homogeneous distribution of dopant may include, but is not limited to, selective deposition, dipping, coating, soaking, mixing, heating, drying, cooling, or any combination thereof. More specifically, enriching processes may control the dopant content, concentration or exposure time at the exterior surface relative to the central region of the body. In certain instances, the exterior surface and immediately adjacent regions in the interior of the body may be exposed to a greater content of dopant over time compared to a central region of the body contained in the volume of the body and spaced apart from the exterior surface. Enriching processes may include controlling at least one of impregnation time, temperature, pressure, dopant concentration, phase and/or viscosity of the dopant-containing medium (e.g., one or more dopant component) to control the depth of impregnation by the dopant. In one particular embodiment, the enriching process may be conducted after an initial impregnation process. The enriching process can include deposition of the dopant onto the exterior surfaces of the impregnated precursor particulate. In one embodiment, the dopant may be in the form of a slurry, paste, or even powder. The impregnated precursor particles may be rolled or mixed with the dopant in a closed container to complete the enriching process. In another embodiment, the enriching process may include soaking and drying particles in a sopant-containing material. The time, temperature, pressure, dopant concentration, and other conditions may be controlled to control the rate of impregnation to create an enriched region in the body of the abrasive particulate.

After forming the impregnated particulate precursor at step 102, the process can continue at step 103 by forming an abrasive particulate from the impregnated particulate precursor. In accordance with an embodiment, the process of forming can further include converting the impregnated particulate precursor to the finally-formed abrasive particulate. Forming the abrasive particulate can include one or more processes, such as volatilization, sintering, conversion of certain crystalline phases, densification, forming of the desired dopant material or a combination thereof. In at least one instance, the process of forming can include sintering of the impregnated particulate precursor to form a densified abrasive particulate having the desired dopant species contained in the body of the abrasive particulate. Sintering may facilitate formation of high temperature phases, such as alpha alumina. Sintering may be conducted at a temperature of at least about 500° C., such as at least about 700° C., or even at least about 800° C. Still, sintering may be conducted at a temperature that is not greater than about 1400° C., such as not greater than 1300° C., such as not greater than 1200° C., such as not greater than 1100° C. or even not greater than about 1000° C. It will be appreciated that sintering may be conducted at a temperature within a range between any of the above minimum and maximum temperatures.

Furthermore, it will be appreciated that sintering may be conducted for a particular time and under a particular atmosphere. For example, sintering may be conducted for at least about 1 minute at ambient conditions, or even at least about 4 minutes, at least about one hour, such as at least about two hours, or even at least about three hours. Furthermore, the atmosphere utilized during sintering may include an oxidizing atmosphere, a reducing atmosphere, or an inert atmosphere.

In accordance with an embodiment, after conducting the forming process, the abrasive particulate can have a density of at least about 95% theoretical density. In other instances, the abrasive particulate may have a greater density, such as at least about 96% or even at least about 97% theoretical density.

After conducting the forming process the abrasive particulate may have a specific surface area of not greater than about 100 $m^2/g$. In still other embodiments, the specific surface area may be not greater than about 90 $m^2/g$, such as not greater than 80 $m^2/g$, or even not greater than about 10 $m^2/g$, or even not greater than about 1 $m^2/g$. Still, the specific surface area of the abrasive particulate may be at least about 0.01 $m^2/g$, or even at least about 0.05 $m^2/g$. It will be appreciated that the specific surface area of the abrasive particulate maybe be within a range between any of the above minimum and maximum values.

In yet another embodiment, the abrasive particulate can have a body having an average or mean particle size, which may be selected from a group of predetermined sieve sizes. For example, the body can have an average particle size of not greater than 5000 microns and at least 0.1 microns. In certain instances, the body can have an average particle size of not greater than about 4 mm, such as not greater than about 3 mm, not greater than about 2 mm, not gather than about 1 mm, or even not greater than about 0.8 mm. Still, in another embodiment, the body may have an average particle size of at least about 0.1 tam. It will be appreciated that the body may have an average particle size within a range between any of the minimum and maximum values noted above.

Particles for use in the abrasives industry are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400 and ANSI 600. FEPA grade designations include P8, P12, P16, P24, P36, P40, P50, P60, P80, P100, P120, P150, P180, P220, P320, P400, P500, P600, P800, P1000 and P1200. JIS grade designations include JIS8, JIS12, JIS 16, JIS24, JIS36, JIS46, JIS54, JIS60, JIS80, JIS 100, JIS150, JIS180, JIS220, JIS240, JIS280, JIS320, JIS360, JIS400, JIS600, JIS800, JIS 1000, JIS 1500, JIS2500, JIS4000, JIS6000, JIS8000 and JIS10,000. Alternatively, the abrasive particulate can be graded to a nominal screened grade using U.S.A. Standard Test Sieves conforming to ASTM E-1 1 "Standard Specification for Wire Cloth and Sieves for Testing Purposes." ASTM E-1 1 prescribes the requirements for the design and construction of testing sieves using a medium of woven wire cloth mounted in a frame for the classification of materials according to a designated particle size. A typical designation may be represented as −18+20 meaning that the particles pass through a test sieve meeting ASTM E-1 1 specifications for the number 18 sieve and are retained on a test sieve meeting ASTM E-1 1 specifications for the number 20 sieve. In various embodiments, the abrasive particulate can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

After forming the abrasive particulate at step 103, one or more processes may be utilized at step 104. As illustrated in FIG. 1, the abrasive particulate may be used in one or more abrasive or non-abrasive applications. For example, the abrasive particulate may be used in a blend of particulate material, such as a blend of different abrasive particles and incorporated into a fixed abrasive or used as a free abrasive. Alternatively, the abrasive particulate does not need to be blended and may be used directly in one or more fixed abrasive or free abrasive applications.

The abrasive particulate can include a body, which may include a first phase and a second phase, wherein the second phase includes the dopant or species from the dopant. In accordance with an embodiment, the first phase may include an oxide, such as alumina, and more particularly, alpha alumina. In one instance, the first phase may consist essentially of alpha alumina. In certain instances, the body may be formed such that it is not greater than about 1 wt % of low-temperature alumina phases. As used herein, low temperature alumina phases can include transition phase aluminas, bauxites or hydrated alumina, including for example gibbsite, boehmite, diaspore, and mixtures containing such compounds and minerals. Certain low temperature alumina materials may also include some content of iron oxide. Moreover, low temperature alumina phases may include other minerals, such as goethite, hematite, kaolinite, and anatase. In particular instances, the particulate material can consist essentially of alpha alumina as the first phase and may be essentially free of low temperature alumina phases.

Furthermore, the abrasive particulate may be formed such that the body includes not greater than about 1 wt % of impurity elements, wherein impurity elements are those species that are unintentional. The dopant is not an impurity. Some exemplary impurity elements can include transition metal elements, alkaline earth elements, alkali elements, or any combination thereof. In one particular instance, the body can include a limited amount of water, such as a content within the body of not greater than about 1 wt % water for the total weight of the body. Moreover, the body can be essentially free of water.

In one aspect, the abrasive particulate may have a body including a first phase having at least about 70 wt % alumina for a total weight of the first phase. For other embodiments, the body can include at least about 71 wt % alumina for the total weight of the first phase, such as least about 75 wt %, at least about 77 wt %, at least about 80 wt %, at least about 83 wt %, at least about 85 wt %, at least about 88 wt %, at least about 90 wt %, at least about 93 wt %, at least about 95 wt %, or even consist essentially of alumina.

Furthermore, the abrasive particulate can have a body, and at least 60 wt % of the body is alumina for a total weight of the body. In other instances, the amount of alumina in the body can be greater, such as at least 70 wt %, or at least 75 wt %, or at least 80 wt %, or at least about 85 wt %, or at least about 90 wt %. Still, the body may include not greater than about 99 wt % alumina for a total weight of the body, such as not greater than 98 wt %, or not greater than 97 wt %, or not greater than 96 wt %, or not greater than 95 wt %, or not greater than 94 wt %, or not greater than 93 wt %, or not greater than 92 wt %, or not greater than 91 wt %, or not greater than 90 wt %. It will be appreciated that the total content of the alumina within the body can be within a range between any of the minimum and maximum percentages noted above.

In yet another embodiment, the abrasive particulate can include a first phase (e.g., oxide material) having discrete crystalline grains defining crystallites having an average grain size (i.e., crystallite size) of not greater than 500 microns. Still, in other instances, the average grain size of the first phase may be not greater than 250 microns, such as not greater than 100 microns, or not greater than 80 microns, or not greater than 50 microns, or not greater than 30 microns, or not greater than 20 microns, or not greater than 10 microns, or not greater than 1 micron, or not greater than 0.9 microns, or not greater than 0.8 microns, or not greater than 0.7 microns, or not greater than 0.6 microns. Still, in at least one embodiment, the first phase may have an average grain size of at least about 0.01 microns, or at least 0.05 microns. It will be appreciated that the average grain size of the first phase can be within a range between any of the minimum and maximum values noted above.

The average grain size (i.e., average crystal size) can be measured based on the uncorrected intercept method using scanning electron microscope (SEM) photomicrographs. Samples of abrasive particles are prepared by making a bakelite mount in epoxy resin then polished with diamond polishing slurry using a Struers Tegramin 30 polishing unit. After polishing the epoxy is heated on a hot plate, the polished surface is then thermally etched for 5 minutes at 150° C. below sintering temperature. Individual particles (5-10 grits) are mounted on the SEM mount then gold coated for SEM preparation. SEM photomicrographs of three individual abrasive particles are taken at approximately 50,000× magnification, then the uncorrected crystallite size is calculated using the following steps: 1) draw diagonal lines from one corner to the opposite corner of the crystal structure view, excluding black data band at bottom of photo 2) measure the length of the diagonal lines as L1 and L2 to the nearest 0.1 centimeters; 3) count the number of grain boundaries intersected by each of the diagonal lines, (i.e., grain boundary intersections I1 and I2) and record this number for each of the diagonal lines, 4) determine a calculated bar number by measuring the length (in centimeters) of the micron bar (i.e., "bar length") at the bottom of each photomicrograph or view screen, and divide the bar length (in microns) by the bar length (in centimeters); 5) add the total centimeters of the diagonal lines drawn on photomicrograph (L1+L2) to obtain a sum of the diagonal lengths; 6) add the numbers of grain boundary intersections for both diagonal lines (I1+I2) to obtain a sum of the grain boundary intersections; 7) divide the sum of the diagonal lengths (L1+L2) in centimeters by the sum of grain boundary intersections (I1+I2) and multiply this number by the calculated bar number. This process is completed at least three different times for three different, randomly selected samples to obtain an average crystallite size.

As noted herein, the body can further include a second phase within the body that may include the dopant. In one instance, the body can include not greater than 50% of the second phase for the total weight of the body. For other embodiments, the content of the second phase within the body can be less, such as not greater than 40 wt %, or not greater than 30 wt %, or not greater than 20 wt %, or not greater than 10 wt %, or not greater than 8 wt %, or not greater than 6 wt %, or not greater than 5 wt %, or not greater than 4 wt %, or not greater than 3 wt % dopant for a total weight of the body. Still, the content of the second phase within the body may be at least 0.5 wt % for a total weight of the body, such as at least 1 wt %, or at least 2 wt %, or at least 3 wt %. It will be appreciated that the content of the second phase within the body can be within a range between any of the minimum and maximum percentages noted above.

In one embodiment, the second phase may consist essentially of the dopant. In another embodiment, the second phase may include a compound including the dopant and other elements. In one instance, the body can include not greater than 18 wt % of the dopant for the total weight of the body. For other embodiments, the body can include less dopant, such as not greater than 16 wt %, or not greater than 14 wt %, or not greater than 12 wt %, or not greater than 10 wt %, or not greater than 8 wt %, or not greater than 6 wt %, or not greater than 5 wt %, or not greater than 4 wt %, or not greater than 3 wt % dopant for a total weight of the body. Still, the content of the dopant within the body may be at least 0.5 wt % for a total weight of the body, such as at least 1 wt %, or at least 2 wt %, or at least 3 wt %. It will be appreciated that the content of the dopant within the body can be within a range between any of the minimum and maximum percentages noted above.

In some instances, the abrasive particulate may include a particular type of dopant selected from the consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, cerium, neodymium, gadolinium. europium, silicon, phosphorous, or any combination thereof. According to one embodiment, the dopant comprises magnesium, and may consist essentially of magnesium or magnesium oxide. As used herein, the expression that the dopant can be magnesium is intended to mean any chemical compound, salt, or complex which contains magnesium, including, but not limited to, elemental magnesium.

The dopant may be disposed in certain places in the microstructure that may facilitate improved performance of the abrasive particulate. For example, the dopant or compound containing the dopant (i.e., dopant compound) may be primary located at the crystalline grain boundaries between the crystal grains of the first phase (e.g., oxide).

In certain instances, the abrasive particulate may have a body having a certain content of porosity. For example, the porosity can be not greater than 5 vol % for a total volume of the body or not greater than 4 vol % or not greater than 3 vol % or not greater than 2 vol % or not greater than 1 vol %. Still, in certain instances it may be suitable that the abrasive particulate is part of an agglomerate, and it will be appreciated that such agglomerates may have a greater content of porosity.

The abrasive particulate or the body of the abrasive particulate may have various shapes and sizes. For example, the abrasive particulate may be may have a randomly shaped abrasive body or shaped abrasive particle or semi-shaped abrasive particle.

Figure 2:
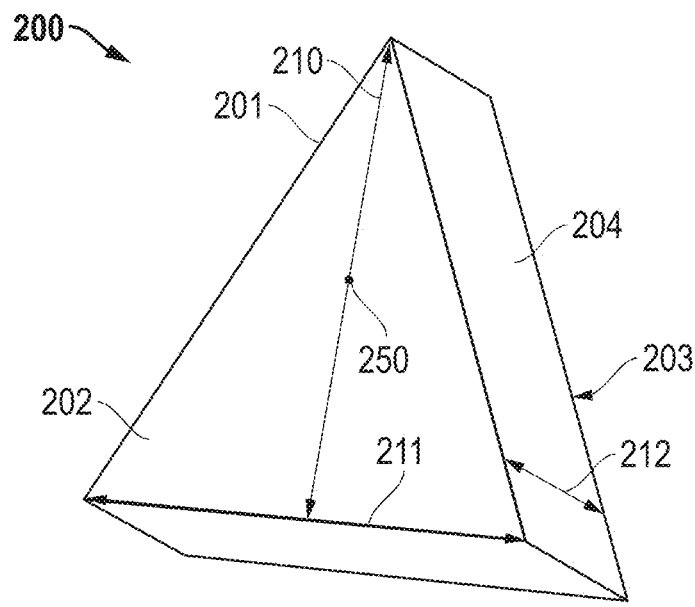
FIGS. 2-5 include perspective view illustrations of abrasive particulates according to embodiments herein.

FIG. 2 includes a perspective view illustration of an abrasive particulate as a shaped abrasive particle in accordance with an embodiment. The shaped abrasive particle 200 can include a body 201 including a major surface 202, a major surface 203, and a side surface 204 extending between the major surfaces 202 and 203. As illustrated in FIG. 2, the body 201 of the shaped abrasive particle 200 can be a thin-shaped body, wherein the major surfaces 202 and 203 are larger than the side surface 204. Moreover, the body 201 can include a longitudinal axis 210 extending from a point to a base and through the midpoint 250 on a major surface 202 or 203. The longitudinal axis 210 can define the longest dimension of the body along a major surface and through the midpoint 250 of the major surface 202. In certain particles, if the midpoint of a major surface of the body is not readily apparent, one may view the major surface top-down, draw a closest-fit circle around the two-dimensional shape of the major surface and use the center of the circle as the midpoint of the major surface.

Shaped abrasive particles may be formed through particular processes, including molding, printing, casting, extrusion, and the like. Shaped abrasive particles can be formed such that the each particle has substantially the same arrangement of surfaces and edges relative to each other. For example, a group of shaped abrasive particles generally have the same arrangement and orientation and or two-dimensional shape of the surfaces and edges relative to each other. As such, the shaped abrasive particles have a relatively high shape fidelity and consistency in the arrangement of the surfaces and edges relative to each other. Moreover, constant height abrasive particles (CHAPs) can also be formed through particular processes that facilitate formation of thin-shaped bodies that can have irregular two-dimensional shapes when viewing the major surface top-down. See, for example, FIG. 4. CHAPs can have less shape fidelity than shaped abrasive particles, but can have substantially planar and parallel major surfaces separated by a side surface.

By contrast, non-shaped particles (see, for example, FIG. 5) can be formed through different processes and have different shape attributes compared to shaped abrasive particles and CHAPs. For example, non-shaped particles are typically formed by a comminution process wherein a mass of material is formed and then broken or exploded and then sieved to obtain abrasive particles of a certain size. However, a non-shaped particle will have a generally random arrangement of surfaces and edges, and generally will lack any recognizable two-dimensional or three dimensional shape in the arrangement of the surfaces and edges. Moreover, non-shaped particles do not necessarily have a consistent shape with respect to each other, and therefore have a significantly lower shape fidelity compared to shaped abrasive particles or CHAPs. The non-shaped particles generally are defined by a random arrangement of surfaces and edges for each particle and with respect to other non-shaped particles Referring again to FIG. 2, the body 201 can further include a lateral axis 211 defining a width of the body 201 extending generally perpendicular to the longitudinal axis 210 on the same major surface 202. Finally, as illustrated, the body 201 can include a vertical axis 212, which in the context of thin shaped bodies can define a height (or thickness) of the body 201. For thin-shaped bodies, the length of the longitudinal axis 210 is greater than the vertical axis 212. As illustrated, the thickness 212 can extend along the side surface 204 between the major surfaces 202 and 203 and perpendicular to the plane defined by the longitudinal axis 210 and lateral axis 211. It will be appreciated that reference herein to length, width, and height of the abrasive particles may be reference to average values taken from a suitable sampling size of abrasive particles of a larger group, including for example, a group of abrasive particle affixed to a fixed abrasive.

The shaped abrasive particles of the embodiments herein, including thin-shaped abrasive particles can have a primary aspect ratio of length:width such that the length can be greater than or equal to the width. Furthermore, the length of the body 201 can be greater than or equal to the height. Finally, the width of the body 201 can be greater than or equal to the height. In accordance with an embodiment, the primary aspect ratio of length:width can be at least 1:1, such as at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 201 of the shaped abrasive particle can have a primary aspect ratio of length:width of not greater than 100:1, not greater than 50:1, not greater than 10:1, not greater than 6:1, not greater than 5:1, not greater than 4:1, not greater than 3:1, not greater than 2:1, or even not greater than 1:1. It will be appreciated that the primary aspect ratio of the body 201 can be within a range including any of the minimum and maximum ratios noted above.

However, in certain other embodiments, the width can be greater than the length. For example, in those embodiments wherein the body 201 is an equilateral triangle, the width can be greater than the length. In such embodiments, the primary aspect ratio of length:width can be at least 1:1.1, or at least 1:1.2, or at least 1:1.3, or at least 1:1.5, or at least 1:1.8, or at least 1:2, or at least 1:2.5, or at least 1:3, or at least 1:4, or at least 1:5, or at least 1:10. Still, in a non-limiting embodiment, the primary aspect ratio length:width can be not greater than 1:100, or not greater than 1:50, or not greater than 1:25, or not greater than 1:10, or not greater than 5:1, or not greater than 3:1. It will be appreciated that the primary aspect ratio of the body 201 can be within a range including any of the minimum and maximum ratios noted above.

Furthermore, the body 201 can have a secondary aspect ratio of width:height that can be at least 1:1, such as at least 1.1:1, at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 201 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated that the secondary aspect ratio of width:height can be within a range including any of the minimum and maximum ratios of above.

In another embodiment, the body 201 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 201 can be not greater than 100:1, such as not greater than 50:1, not greater than 10:1, not greater than 8:1, not greater than 6:1, not greater than 5:1, not greater than 4:1, not greater than 3:1. It will be appreciated that the tertiary aspect ratio the body 201 can be within a range including any of the minimum and maximum ratios and above.

The abrasive particulates of the embodiments herein, including the shaped abrasive particles, can include a crystalline material, and more particularly, a polycrystalline material. Notably, the polycrystalline material can include abrasive grains. In one embodiment, the body of the abrasive particle, including for example, the body of a shaped abrasive particle can be essentially free of an organic material, such as, a binder. In at least one embodiment, the abrasive particles can consist essentially of a polycrystalline material. In another embodiment, the abrasive particles, such as shaped abrasive particles can be free of silane, and particularly, may not have a silane coating.

FIG. 2 includes an illustration of a shaped abrasive particle having a two-dimensional shape as defined by the plane of the upper major surface 202 or major surface 203, which has a generally triangular two-dimensional shape. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, regular polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, shapes including a central region and a plurality of arms (e.g., at least three arms) extending from a central region (e.g., star shapes), and a combination thereof. Particular polygonal shapes include rectangular, trapezoidal, quadrilateral, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 3:
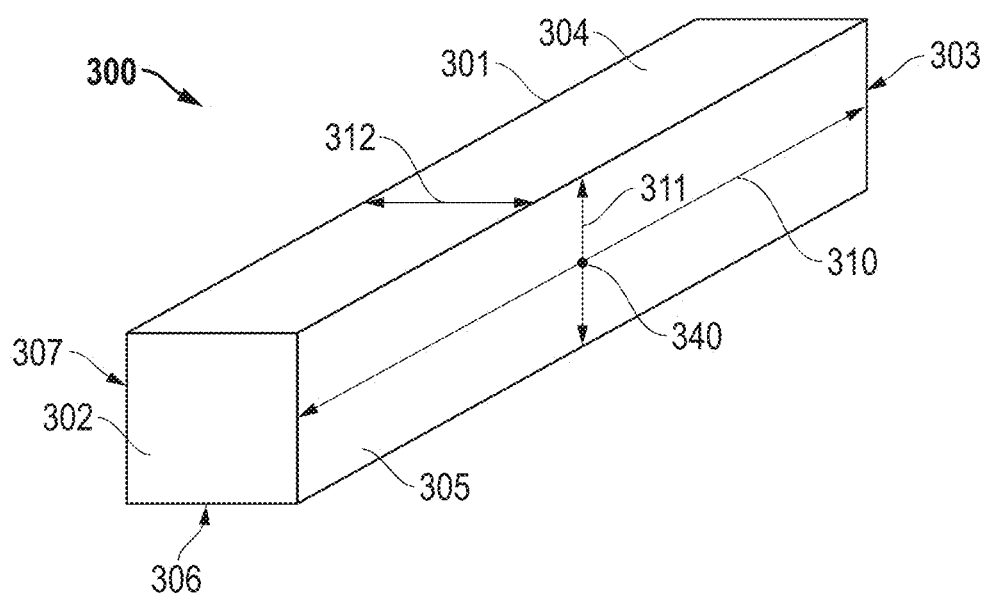

FIG. 3 includes a perspective view illustration of a shaped abrasive particle according to another embodiment. Notably, the shaped abrasive particle 300 can include a body 301 including a surface 302 and a surface 303, which may be referred to as end surfaces 302 and 303. The body 301 can further include major surfaces 304, 305, 306, 307 extending between and coupled to the end surfaces 302 and 303. The shaped abrasive particle of FIG. 3 is an elongated shaped abrasive particle having a longitudinal axis 310 that extends along the major surface 305 and through the midpoint 340 between the end surfaces 302 and 303. For particles having an identifiable two-dimensional shape, such as the shaped abrasive particles of FIGS. 2 and 3, the longitudinal axis is the dimension that would be readily understood to define the length of the body through the midpoint on a major surface. For example, in FIG. 3, the longitudinal axis 310 of the shaped abrasive particle 300 extends between the end surfaces 302 and 303 parallel to the edges defining the major surface as shown. Such a longitudinal axis is consistent with how one would define the length of a rod. Notably, the longitudinal axis 310 does not extend diagonally between the corners joining the end surfaces 302 and 303 and the edges defining the major surface 305, even though such a line may define the dimension of greatest length. To the extent that a major surface has undulations or minor imperfections from a perfectly planar surface, the longitudinal axis can be determined using a top-down, two-dimensional image that ignores the undulations.

It will be appreciated that the surface 305 is selected for illustrating the longitudinal axis 310, because the body 301 has a generally square cross-sectional contour as defined by the end surfaces 302 and 303. As such, the surfaces 304, 305, 306, and 17 can be approximately the same size relative to each other. In the context of other elongated abrasive particles, the surfaces 302 and 303 can have a different shape, for example, a rectangular shape, and as such, at least one of the surfaces 304, 305, 306, and 307 may be larger relative to the others. In such instances, the largest surface can define the major surface and the longitudinal axis would extend along the largest of those surfaces through the midpoint 340 and may extend parallel to the edges defining the major surface. As further illustrated, the body 301 can include a lateral axis 311 extending perpendicular to the longitudinal axis 310 within the same plane defined by the surface 305. As further illustrated, the body 301 can further include a vertical axis 312 defining a height of the abrasive particle, were in the vertical axis 312 extends in a direction perpendicular to the plane defined by the longitudinal axis 310 and lateral axis 311 of the surface 305.

Figure 10:
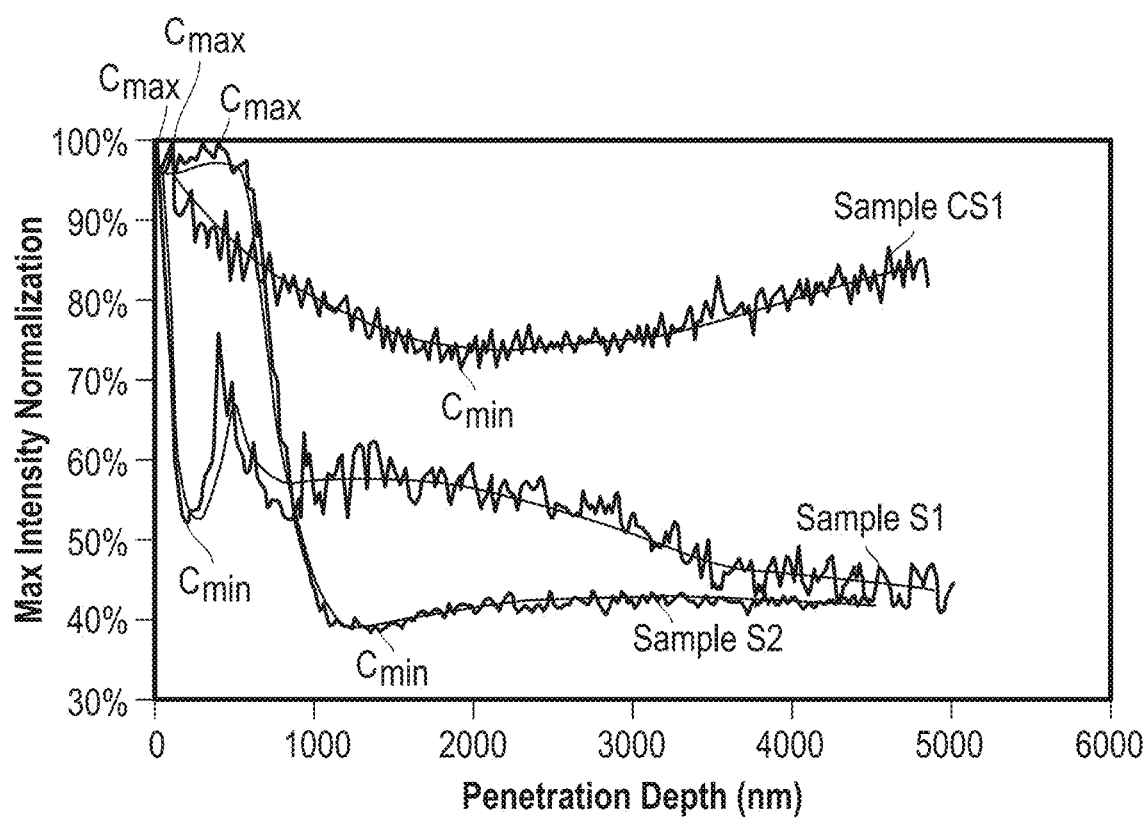
FIG. 10 includes plots of maximum intensity normalization versus penetration depth for abrasive particulates of the Examples.

It will be appreciated that like the thin shaped abrasive particle of FIG. 2, the elongated shaped abrasive particle of FIG. 3 can have various two-dimensional shapes, such as those defined with respect to the shaped abrasive particle of FIG. 10. The two-dimensional shape of the body 301 can be defined by the shape of the perimeter of the end surfaces 302 and 303. The elongated shaped abrasive particle 1100 can have any of the attributes of the shaped abrasive particles of the embodiments herein.

Figure 4:
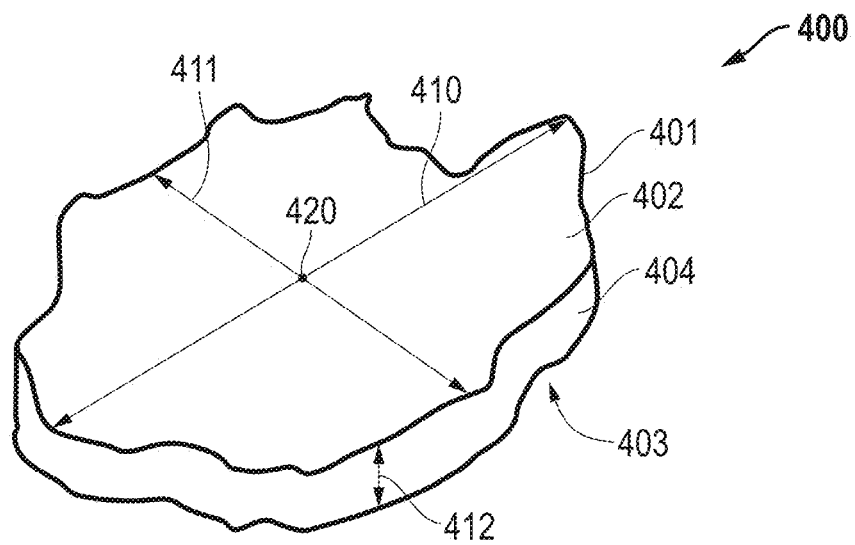

FIG. 4 includes a perspective view illustration of a controlled height abrasive particle (CHAP) according to an embodiment. As illustrated, the CHAP 400 can include a body 401 including a first major surface 402, a second major surface 403, and a side surface 404 extending between the first and second major surfaces 402 and 403. As illustrated in FIG. 4, the body 401 can have a thin, relatively planar shape, wherein the first and second major surfaces 402 and 403 are larger than the side surface 404 and substantially parallel to each other. Moreover, the body 401 can include a longitudinal axis 410 extending through the midpoint 420 and defining a length of the body 401. The body 401 can further include a lateral axis 411 on the first major surface 402, which extends through the midpoint 420 of the first major surface 402, perpendicular to the longitudinal axis 410, and defining a width of the body 401.

The body 401 can further include a vertical axis 412, which can define a height (or thickness) of the body 401. As illustrated, the vertical axis 412 can extend along the side surface 404 between the first and second major surfaces 402 and 403 in a direction generally perpendicular to the plane defined by the axes 410 and 411 on the first major surface. For thin-shaped bodies, such as the CHAP illustrated in FIG. 4, the length can be equal to or greater than the width and the length can be greater than the height. It will be appreciated that reference herein to length, width, and height of the abrasive particles may be referenced to average values taken from a suitable sampling size of abrasive particles of a batch of abrasive particles.

Unlike the shaped abrasive particles of FIGS. 2 and 3, the CHAP of FIG. 4 does not have a readily identifiable two-dimensional shape based on the perimeter of the first or second major surfaces 402 and 403. Such abrasive particles may be formed in a variety of ways, including but not limited to, fracturing of a thin layer of material to form abrasive particles having a controlled height but with irregularly formed, planar, major surfaces. For such particles, the longitudinal axis is defined as the longest dimension on the major surface that extends through a midpoint on the surface. To the extent that the major surface has undulations, the longitudinal axis can be determined using a top-down, two-dimensional image that ignores the undulations. Moreover, as noted above, a closest-fit circle may be used to identify the midpoint of the major surface and identification of the longitudinal and lateral axes.

Figure 5:
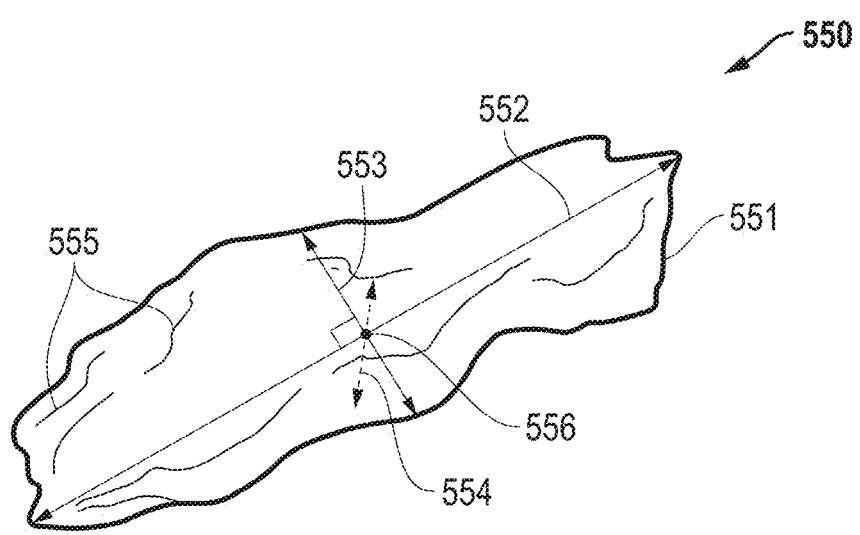

FIG. 5 includes an illustration of a non-shaped particle, which may be an elongated, non-shaped abrasive particle or a secondary particle, such as a diluent grain, a filler, an agglomerate or the like. The non-shaped particle 550 can have a body 551 including a generally random arrangement of edges 555 extending along the exterior surface of the body 551. The body can further include a longitudinal axis 552 defining the longest dimension of the particle. The longitudinal axis 552 defines the longest dimension of the body as viewed in two-dimensions. Thus, unlike shaped abrasive particles and CHAPs, where the longitudinal axis is measured on the major surface, the longitudinal axis of a non-shaped particle is defined by the points on the body furthest from each other as the particle is viewed in two-dimensions using an image or vantage that provides a view of the particle's longest dimension. That is, an elongated particle, but non-shaped particles, such as illustrated in FIG. 5, should be viewed in a perspective that makes the longest dimension apparent to properly evaluate the longitudinal axis. The body 551 can further include a lateral axis 553 extending perpendicular to the longitudinal axis 552 and defining a width of the particle. The lateral axis 553 can extend perpendicular to the longitudinal axis 552 through the midpoint 556 of the longitudinal axis in the same plane used to identify the longitudinal axis 552. The abrasive particle may have a height (or thickness) as defined by the vertical axis 554. The vertical axis 554 can extend through the midpoint 556 but in a direction perpendicular to the plane used to define the longitudinal axis 552 and lateral axis 553. To evaluate the height, one may have to change the perspective of view of the abrasive particle to look at the particle from a different vantage than is used to evaluate the length and width.

As will be appreciated, the abrasive particle can have a length defined by the longitudinal axis 552, a width defined by the lateral axis 553, and a vertical axis 554 defining a height. As will be appreciated, the body 551 can have a primary aspect ratio of length:width such that the length is equal to or greater than the width. Furthermore, the length of the body 551 can be equal to or greater than or equal to the height. Finally, the width of the body 551 can be greater than or equal to the height 554. In accordance with an embodiment, the primary aspect ratio of length:width can be at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 551 of the elongated shaped abrasive particle can have a primary aspect ratio of length:width of not greater than 100:1, not greater than 50:1, not greater than 10:1, not greater than 6:1, not greater than 5:1, not greater than 4:1, not greater than 3:1, or even not greater than 2:1. It will be appreciated that the primary aspect ratio of the body 551 can be within a range including any of the minimum and maximum ratios noted above.

Furthermore, the body 551 can include a secondary aspect ratio of width:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 551 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 551 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 551 can be not greater than 100:1, such as not greater than 50:1, not greater than 10:1, not greater than 8:1, not greater than 6:1, not greater than 5:1, not greater than 4:1, not greater than 3:1, It will be appreciated that the tertiary aspect ratio the body 551 can be with a range including any of the minimum and maximum ratios and above.

The non-shaped particle 550 can have any of the attributes of abrasive particles described in the embodiments herein, including for example but not limited to, composition, microstructural features (e.g., average grain size), hardness, porosity, and the like.

It been evaluated through empirical means that the bodies of certain non-shaped abrasive particles can differ from one other. For example, upon comparing the relative sharpness of the shapes created through two comminution techniques to create non-shaped abrasive particles it was noted that abrasive particles form through explosive comminution means may have a sharper shape as compared to those formed through other conventional comminution means. For example, the body can have an average radius of curvature (which is inversely related to the sharpness) of not greater than 115 microns, such as not greater than 110 microns, or not greater than 105, microns or not greater than 100 microns, or not greater than 95 microns. The abrasive particulate of the embodiments herein may be an exploded non-shaped abrasive particle.

Figure 11:
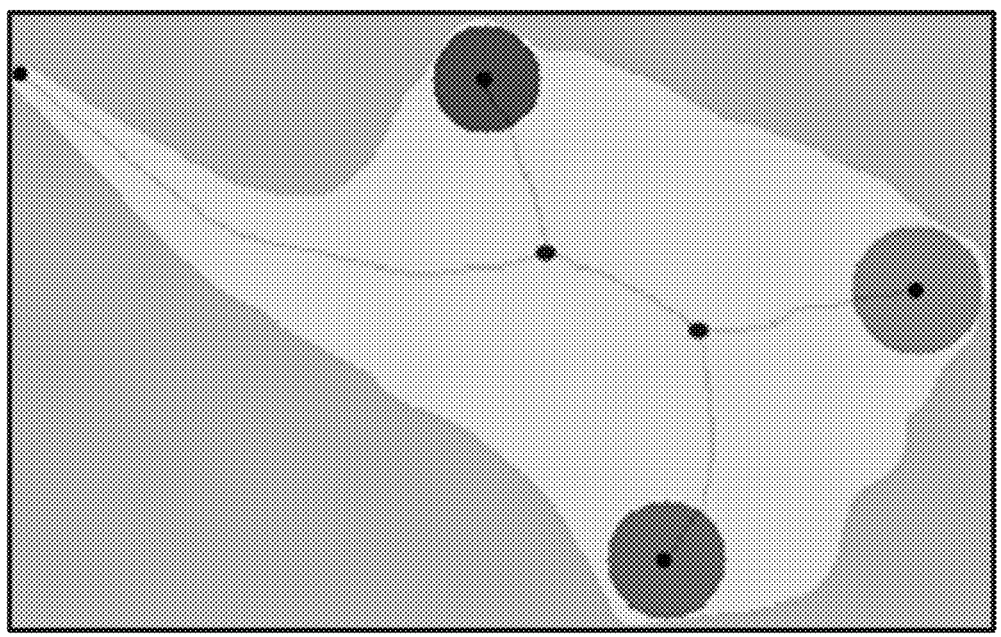
FIG. 11 includes a SEM image of an abrasive particle and measurement of average radius of curvature according to an embodiment.

The average sharpness of the abrasive particles is evaluated by a radius of curvature approach. The radii of curvature of the protrusions of a grain are measured, which are inversely related to the sharpness. The radii of curvature for a given grain are estimated from the skeletonized image of the grain, which is a 1-pixel wide representation of the overall shape the grain. Many different skeletonization algorithms exist and have subtle differences, the skeletons used in calculating the radii of curvature in this work were computed using the "Skeletonize" function in the skimage library (version 0.13.1) in the python (version 3.6.3) programming language. The endpoints of the skeleton correspond to protrusions in the overall shape, and can be identified as cutting points in abrasive grains. These endpoints of the skeleton are defined by pixels with a connectivity value of 1 neighboring pixel within a 3×3 box centered around the pixel. Other pixels in the skeleton that are not an endpoint are guaranteed to have to have greater than one neighboring pixel. From the terminal points of the skeletonized images, tangent circles can be drawn to the boundary of the original object, and their radius can be calculated. See, for example, FIG. 11. If there is a sharp part of an object, the circle will be very close to the border of the shape, and the calculated radius will be small. Conversely if there is a dull feature, the circle that is tangent to the border will be much larger. For a given branch point the radius of curvature is calculated using a function that computes the smallest geometric distance from the connectivity 1 pixel to any of the (x,y) value pairs in the boarder of the original shape using the following formula: $R_c = \min\{\sqrt{(x_i-X)^2+(y_i-Y)^2}\}$ where "i" is an index of a border pixel (x,y) pair and (X,Y) is the branch end point. All of the radii of curvature for a given grain can be averaged to obtain the grain average radius of curvature, and the grain average radii of curvature can be averaged to obtain the batch average radius of curvature.

The plurality of abrasive particles may have a particular specific length, wherein specific length is measured as the Feret maximum length squared (Feret Max2) divided by the area of the particle. The maximum ferret length is determined on the basis of distance measurement, wherein two straight lines between opposite sides of the measured particle are positioned (like a sliding caliper) at 32 angle positions. The maximum value determined by these measurements is the maximum ferret. The measurements were conducted on at least 400 particles using suitable imaging software on a camera, such as Zeiss Image Analysis software (Zen Pro). The calculation of specific length may have a distribution. Herein, the specific length is related to the 50 percentile of specific length or the median specific length. According to one embodiment, the abrasive particles of the embodiments herein can have a specific length of at least 1.8, such as at least 1.9, or at least 2.0, or at least 2.1, or at least 2.2, or at least 2.3, or at least 2.4, or at least 2.5, or at least 2.6, or at least 2.7, or at least 2.8, or at least 2.9, or at least 3.0. Still, in one non-limiting embodiment, the specific length can be not greater than 4.0, or not greater than 3.9 or not greater than 3.8, or not greater than 3.7, or not greater than 3.6, or not greater than 3.5, or not greater than 3.4, or not greater than 3.3, or not greater than 3.2, or not greater than 3.1, or not greater than 3.0, or not greater than 2.9, or not greater than 2.8, or not greater than 2.7, or not greater than 2.6, or not greater than 2.5, or not greater than 2.4, or not greater than 2.3, or not greater than 2.2, or not greater than 2.1, or not greater than 2.0. It will be appreciated that the specific length can be within a range including any of the minimum and maximum values noted above.

Figure 6A:
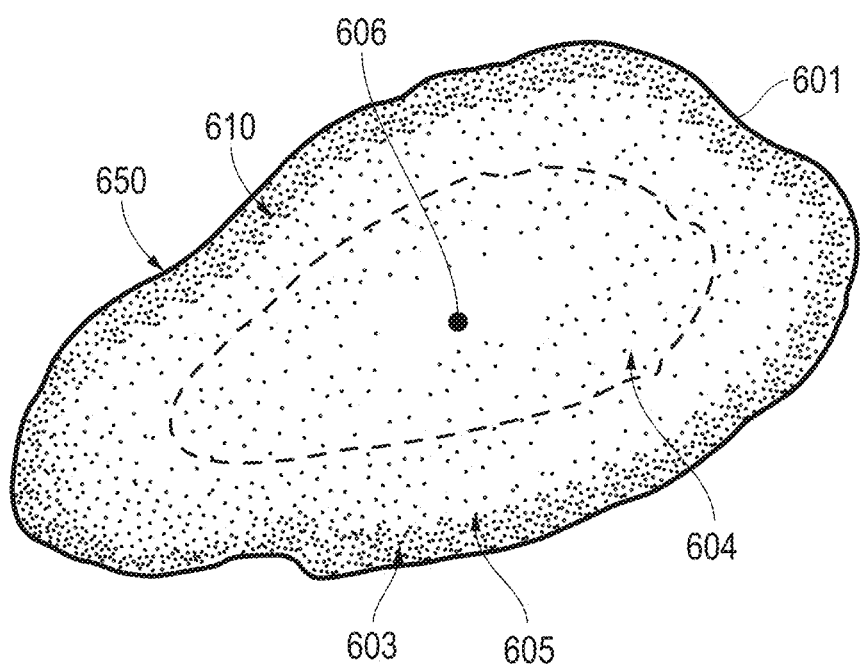
FIG. 6A includes a cross-sectional illustration of an abrasive particulate according to an embodiment.

FIG. 6A includes a cross-sectional view illustration of an abrasive particulate having a body 601 including an exterior surface 650 and a non-homogeneous distribution of a dopant 610 throughout the volume of the body. The abrasive particulate may be formed through the processes of the embodiments herein, and may include an enriched region 603 abutting the exterior surface 650 and defining a region of significantly greater content of dopant 610 as compared to other regions within the body 601. The body 601 may further include a doped region 604 in the central region of the body spaced apart from the exterior surface 650. The central region surrounds a central point 606 of volume of the body 601. As illustrated in the embodiment of FIG. 6A, the enriched region 603 can define a portion of the body including the exterior surface and extends for a small depth into the body 601. Further into the body 601 beyond the enriched region 603, the content of dopant decreases significantly and can define a depletion region 605 between the enriched region 603 and the doped region 604. The change in the content of dopant is most severe in the depletion region 605 compared to the change in dopant content in the enriched region 603 and/or the doped region 604.

Figure 6B:
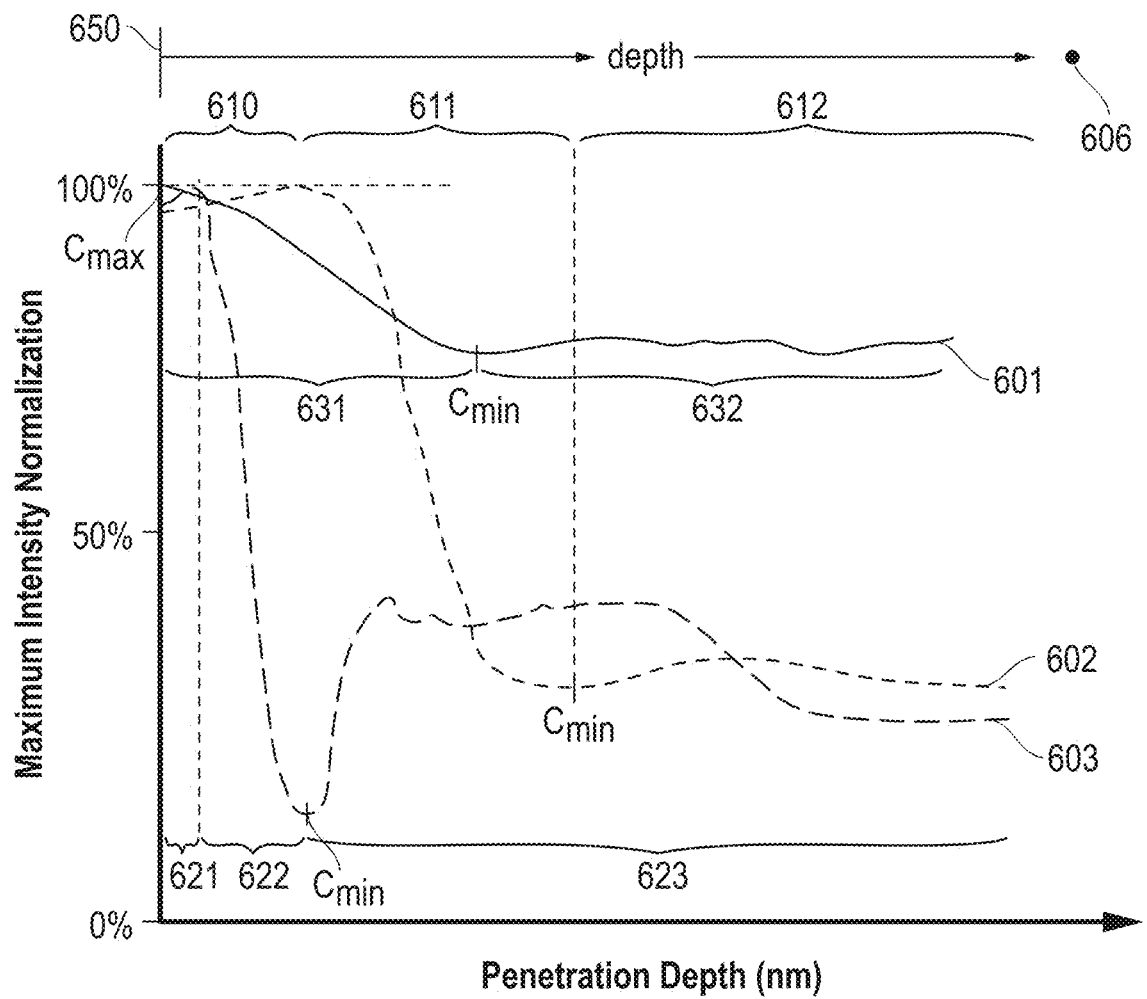
FIG. 6B includes three generalized plots of maximum intensity normalization versus penetration depth for three abrasive particulates, some of which are representative of the embodiments herein.

FIG. 6B includes generalized plots of dopant concentration based on maximum intensity normalization versus penetration depth. Notably, the plot of FIG. 6B illustrates the content of the dopant for a given penetration depth into the body. The method to create such plots and evaluate the features described herein is provided in more detail below. As illustrated above the plot, the exterior surface 650 of the abrasive particulate is defined by the y-axis and the depth away from the exterior surface 650 is defined as the penetration depth in nanometers. Curve 601 is a generic curve generally demonstrating the change in dopant content with penetration depth into the body of the abrasive particulate for on a conventionally impregnated particle. Curves 602 and 603 illustrate various possible embodiments and changes in dopant content for abrasive particulates that are formed by using an enrichment process of the present disclosure.

More specifically, curve 602 includes an enrichment region 610, a doped region 612 and a depletion region 611 between the enrichment region 610 and the doped region 612. The enrichment region 610 can extend between the exterior surface 650 of the body and the point on the curve defining the greatest content of the dopant (i.e., Cmax). The depletion region 611 extends between the points on the curve defining the greatest content of the dopant (Cmax) and the lowest content of the dopant or the point wherein the drop of the dopant content changes to a much lower decrease (%/nm) with further penetration depth for the first half of the curve (i.e., Cmin). The doped region 612 is the portion of the curve extending into the body beyond Cmin. The doped region 612 is spaced apart from the enriched region 610 by the depletion region 611. The doped region 612 may be characterized by a generally small change in the dopant content as penetration depth varies, such that the doped region 612 region is characterized by a substantially constant content of the dopant. In particular instances, a substantially constant content of dopant is characterized by a variation in the dopant content of not greater than approximately 20%, or not greater than 15%, or not greater than 10% over a majority of measured region.

Curve 603 also defines an enrichment region 621, a depletion region 622 and a doped region 623. Notably, the enrichment region 621 extends for less distance into the body as compared to the enrichment region 610. The depletion region 622 is also characterized by a greater decrease in the dopant content over a shorter distance of depth compared to depletion region 611.

Curve 601 is intended to represent a general curve representative of a conventionally impregnated body based on empirical studies. The greatest content of the dopant is at the surface (Y=0). The region 631 demonstrates a gradual decrease in the dopant content to Cmin. The region 632 of curve 601 demonstrates a relatively steady content of dopant with change in penetration depth.

The process to create such a plot is started by obtaining samples of the finally-formed abrasive particles and preparing them in a manner suitable for analysis via Time-of-Flight Secondary Ion Mass Spectrometry (i.e., TOF-SIMS). A suitable number of randomly selected abrasive particles is used to create one or more samples. The one or more samples are analyzed via TOF-SIMS according to conditions using primary ions of $Bi_1^+$ at 25 keV and a current of approximately 2.5 pA, and an analysis area of 50×50 µm² (i.e., 128×128 pixels). The analysis also uses positive secondary ions and a charge compensation of less than 20 eV. Sputtering conditions include primary ions of $O_2^+$ at 2 keV and 610 nA, a sputtered area of 200×200 µm². The analysis cycle is acquisition of 1 scan from 0 to 210 uma (max time of flight=50 µs), with an erosion of 50 frames and pause of 0.5 seconds. From this analysis, data of constance reference intensity normalization versus penetration depth (nm). Multiple curves are analyzed together by normalizing the curves on the same plot and dividing each point on the curve by the highest reference intensity normalization value, such that each of the plots has the maximum value at 100%. This creates a plot of maximum intensity normalization versus penetration depth, which can be used to evaluate the features described in embodiments herein. A best fit line may also be applied to the curve, which may assist with identifying different regions in the abrasive particles as described in detail herein.

In one embodiment, the abrasive particulate of the embodiments herein may have a particular maximum normalized dopant content difference ($\Delta C = Cmax - Cmin$) of at least 35%. The maximum normalized dopant content difference is the difference between the greatest normalized dopant content value (i.e., Cmax at 100%) minus the lowest dopant content value (i.e., Cmin) on the first half of the curve of maximum intensity normalization versus penetration depth. As illustrated in FIG. 6B, Cmin corresponds to the point wherein the depletion region ends and the dopent region begins. In a certain embodiment, the dopant concentration can further decrease with increasing penetration depth in the doped region, however, for the calculation of $\Delta C$, the change from depletion region to doped region is used, and not the lowest value in the doped region. In one embodiment, the maximum normalized dopant content difference can be at least 36%, or at least 37%, or at least 38%, or at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%. Still, in another non-limiting embodiment the maximum normalized dopant content difference can be not greater than 99%, such as not greater than 95%, or not greater than 90%, or not greater than 85%, or not greater than 80%, or not greater than 75%, or not greater than 70%, or not greater than 65%, or not greater than 60%. It will be appreciated that maximum normalized dopant content difference can be within a range including any of the minimum and maximum percentages noted above. The abrasive particulates may have a greater maximum normalized dopant content difference as compared to conventionally impregnated particulates.

In another embodiment, the depletion region 611 or 622 can define a region having a significant decrease in the normalized content of the dopant, such as greater than 0.04%/nm. The change in normalized dopant content is calculated as $\Delta Dr=(\Delta C/d)$, wherein "$\Delta C$"=(Cmax−Cmin) and "d" is the distance between Cmax and Cmin as measured by the depth (nm). In other instances, the decrease in the normalized content of the dopant can be at least 0.04%/nm, such as at least 0.05%/nm, or at least 0.06%/nm, or at least 0.08%/nm, or at least 0.10%/nm, or at least 0.20%/nm, or at least 0.22%/nm, or at least 0.23%/nm, or at least 0.25%/nm, or at least 0.26%/nm, or at least 0.27%/nm, or at least 0.28%/nm, or at least 0.29%/nm, or at least 0.30%/nm. The decrease is represented as a positive number since is referred to as a decrease. If one were to refer to the change, it would be suitable to make the above values negative to indicate a decrease. Still, in another non-limiting embodiment, the decrease in the normalized content of the dopant can be less than 0.5%/nm, such as not greater than 0.48%/nm, or not greater than 0.45%/nm, or not greater than 0.43%/nm, or not greater than 0.40%/nm, or not greater than 0.35%/nm. It will be appreciated that the decrease in the normalized content of the dopant in the depletion region can be within range including any of the minimum and maximum values noted above. Any values provided herein with respect to normalized dopant contents and/or change in normalized dopant content can be average values based on a suitable number of samples of a batch of abrasive particulate.

The doped region 612 or 623 may be characterized by a substantially constant dopant content, and thus have a particularly low change in normalized dopant content as calculated by $\Delta Dd=((Cmax(l)−Cmin)/d)$, wherein "Cmax(l)" is the local maximum value in the doped region 612 or 623, "Cmin" is the minimum content of the dopant on the curve defining the beginning of the doped region 612 or 623, and "d" is the distance between Cmax(l) and Cmin as measured by the depth (nm). In one embodiment, the change (either increase or decrease) in the normalized content of the dopant can be not greater than 0.04%/nm, or not greater than 0.03%/nm, or not greater than 0.02%/nm, or not greater than 0.01%/nm. Still, in another non-limiting embodiment, the change in the normalized content of the dopant can be at least 0.001%/nm or at least 0.005%/nm, or at least 0.008%/nm, or at least 0.01%/nm. It will be appreciated that the change in the normalized content of the dopant in the doped region 612 or 623 can be within range including any of the minimum and maximum values noted above. The values above are absolute values without positive or negative signs. It is possible for the change in normalized dopant content in the doped region 612 or 623 to increase or decrease, but the percent change is recorded as an absolute value.

The enriched region 610 or 621 may be characterized by a substantially constant dopant content, and thus have a particularly low change in normalized dopant content as calculated by $\Delta De=((Cmax−Cmin(l))/d)$, wherein "Cmax" is the maximum content of the dopant on the curve defining the end of the enriched region 610 or 621, "Cmin(l) is a local minimum value between the exterior surface 650 and Cmax, and "d" is the distance between Cmax and Cmin(l) as measured by the depth (nm). In one embodiment, the change (either increase or decrease) in the normalized content of the dopant can be not greater than 0.04%/nm, or not greater than 0.03%/nm, or not greater than 0.02%/nm, or not greater than 0.01%/nm. Still, in another non-limiting embodiment, the change in the normalized content of the dopant can be at least 0.001%/nm, or at least 0.005%/nm, or at least 0.007%/nm. It will be appreciated that the change in the normalized content of the dopant in the enriched region 610 or 621 can be within range including any of the minimum and maximum values noted above. The values above are absolute values without positive or negative signs. It is possible for the change in normalized dopant content in the enriched region 610 or 621 to increase or decrease, but the percent change is recorded as an absolute value.

In accordance with another embodiment, the depletion region 611 or 622 can be characterized by a maximum normalized change in dopant content that is greater than the maximum normalized change in dopant content in the enriched region 610 or 621. For example, the maximum normalized change in dopant content in the depletion region 611 or 622, which is represented by ($\Delta C$=Cmax−Cmin), may be at least 2 times greater than the maximum normalized change in dopant content in the enriched region 610 or 621, such as at least 3 times greater or at least 4 times greater at least 5 times greater than the maximum normalized change in dopant content in the enriched region 610 or 621. The maximum normalized change in dopant content in the enriched region 610 or 621 is measured as the difference between Cmax and the lowest local minimum between the exterior surface 650 and Cmax.

In accordance with another embodiment, the depletion region 611 or 622 can be characterized by a maximum normalized change in dopant content that is greater than the maximum normalized change in dopant content in the doped region 612 or 623. For example, the maximum normalized change in dopant content in the depletion region 611 or 622, which is represented by ($\Delta C$=Cmax−Cmin), may be at least 2 times greater than the maximum normalized change in dopant content in the doped region 612 or 623, such as at least 3 times greater or at least 4 times greater at least 5 times greater than the maximum normalized change in dopant content in the doped region 612 or 623. The maximum normalized change in dopant content in the doped region 612 or 623 can be measured as the difference between the greatest local maximum in the doped region 612 or 623 and Cmin.

In another embodiment, the depletion region 611 on curve 602 can be closer to the exterior surface 601 of the body than a central point 606 in a central region of the body. In particular instances, the beginning of the depletion region, which can be characterized by Cmax can be closer to the exterior surface 650 of the body than a central point 606 of the body. In still another embodiment, the end of the depletion region 610 or 621, characterized by Cmin, may be closer to the exterior surface 650 of the body than a central point 606 of the body.

The enriched region 610 or 621 can extend for an average depth of not greater than 3000 nm into the body, such as not to than 2800 nm, or not greater than 2500 nm, or not greater than 2300 nm, or not greater than 2000 nm, or not greater than 1800 nm, or not greater than 1600 nm, or not greater than 1400 nm, or not greater than 1200 nm, or not greater than 1000 nm, or not greater than 900 nm, or not greater than 800 nm, or not greater than 700 nm, or not greater than 600 nm, or not greater than 500 nm, or not greater than 400 nm, or not greater than 350 nm, or not greater than 300 nm, or not greater than 250 nm, or not greater than 200 nm, or not greater than 150 nm, or not greater than 100 nm. Still, in at least one non-limiting embodiment, the enriched region 610 or 621 can extend for at least 1 nm into the body, such as at least 5 nm or even at least 10 nm into the body from the exterior surface 650 of the body.

The point of maximum dopant content (Cmax) region defines the start of the depletion region 611 or 622 at the boundary of the enriched region 610 or 621 and the depletion region 611 and 622. The point defining the minimum content of dopant in the body (Cmin) can be within the doped region 612 or 623 and define the boundary between the depletion region 611 and 622 and the doped region 612 or 623. In accordance with one embodiment, the doped region 612 or 623 can extend for a greater distance in the body (as measured by the penetration depth) than the distance of the enriched region 610 or 621. In another embodiment, the doped region 612 or 623 can extend for a greater distance into the body than the depletion region 611 or 621. In still another embodiment, the depletion region 611 or 621 can extend for a greater distance in the body as compared to the doped region 612 or 623. In yet another alternative embodiment, the enriched region 610 or 621 can extend for greater distance in the body than the depletion region 611 or 622.

In more particular terms, the doped region 612 or 623 may extend for a length of at least 1000 nm as measured by the penetration depth (nm). For example, the length of the doped region 612 or 623 may be at least 1200 nm or at least 1500 nm or at least 2000 nm. Still, in another embodiment, the doped region may not extend of the entire length of the body.

The abrasive particulate may be incorporated into various types of abrasive articles including, fixed abrasive articles such as coated abrasives, bonded abrasives, non-woven abrasives, and the like. The fixed abrasive article may include a plurality of abrasive particles. In certain instances, all of the abrasive particle of the plurality of abrasive particles can be the abrasive particulates of the embodiments herein. In other embodiments, the fixed abrasive may include a blend of abrasive particles such that the blend includes a first type including a plurality of abrasive particulates and a second type of abrasive that is different than the first type by at least one abrasive characteristic from the group of average particle size, two-dimensional shape, three-dimensional shape, composition, hardness, toughness, friability, density, grain size, agglomeration state, or any combination thereof.

The blend of abrasive particles may include a particular content of the plurality of abrasive particulates, which may facilitate improved performance of the abrasive article. For example, the blend of abrasive particles may include at least 10% abrasive particulates such as at least 15%, or at least 20%, or at least 30%, or at least 40%, or at least 50%, release 60%, or at least 70%, at least 80%, or even at least 90% abrasive particulates. Still, in another non-limiting embodiment, the percentage of abrasive particulates in the blend can be not greater than 99%, such as not greater than 95%, or not greater than 90%, or not greater than 80%, or not greater than 70%, or not greater than 60%, or not greater than 50%, or not greater than 40%, or not greater than 30%, or not greater than 20%, or not greater than 15%. It will be appreciated that the content of abrasive particulates in the blend can be within a range including any of the minimum and maximum percentages noted above.

Figure 7:
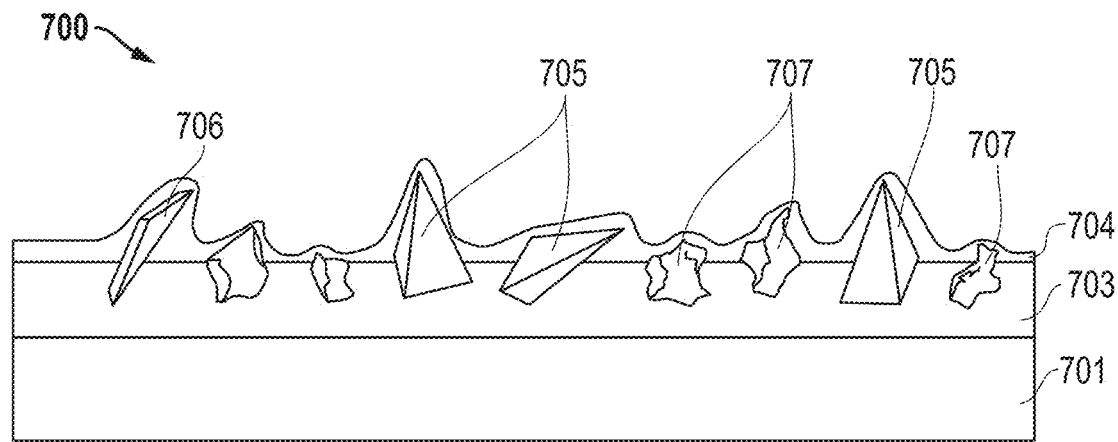
FIG. 7 includes a cross-sectional illustration of a coated abrasive article incorporating the abrasive particulate in accordance with an embodiment.

FIG. 7 includes a cross-sectional illustration of a coated abrasive article incorporating the abrasive particulate in accordance with an embodiment. As illustrated, the coated abrasive 700 can include a substrate 701 and a make coat 703 overlying a surface of the substrate 701. The coated abrasive 700 can include a blend of abrasive particles including a first type of abrasive particulate 705 and a second type of abrasive particulate 706. The first type of abrasive particulate 705 may be abrasive particulates of the embodiments herein and may be a shaped abrasive particle. The second type of abrasive particulates 706 may be abrasive particulates of the embodiments herein, and may include non-shaped abrasive particles. The coated abrasive 700 may also include a third type of particulate material 707, which may be a secondary particle, such as a diluent particle, a filler, and the like. The coated abrasive 700 may further include size coat 704 overlying and bonded to the particulate materials 705, 706, 707, and the make coat 703.

According to one embodiment, the substrate 701 can include an organic material, inorganic material, and a combination thereof. In certain instances, the substrate 701 can include a woven material. However, the substrate 701 may be made of a non-woven material. Particularly suitable substrate materials can include organic materials, including polymers, and particularly, polyester, polyurethane, polypropylene, polyimides such as KAPTON from DuPont, paper or any combination thereof. Some suitable inorganic materials can include metals, metal alloys, and particularly, foils of copper, aluminum, steel, and a combination thereof.

The make coat 703 can be applied to the surface of the substrate 701 in a single process, or alternatively, the particulates 705, 706, 707 can be combined with a make coat 703 material and the combination of the make coat 703 and particulates 705-707 can be applied as a mixture to the surface of the substrate 701. In certain instances, controlled deposition or placement of the particulates 705-707 in the make coat may be better suited by separating the processes of applying the make coat 703 from the deposition of the particulates 705-707 in the make coat 703. Still, it is contemplated that such processes may be combined. Suitable materials of the make coat 703 can include organic materials, particularly polymeric materials, including for example, polyesters, epoxy resins, polyurethanes, polyamides, polyacrylates, polymethacrylates, polyvinylchlorides, polyethylene, polysiloxane, silicones, cellulose acetates, nitrocellulose, natural rubber, starch, shellac, and mixtures thereof. In one embodiment, the make coat 703 can include a polyester resin. The coated substrate can then be heated in order to cure the resin and the abrasive particulate material to the substrate. In general, the coated substrate 701 can be heated to a temperature of between about 100° C. to less than about 250° C. during this curing process.

The particulates 705-707 can include different types of abrasive particles according to embodiments herein. The different types of abrasive particles can include different types of shaped abrasive particles, CHAPs, non-shaped abrasive particles, secondary particles, fillers, or any combination thereof. The different types of particles can be different from each other in composition, two-dimensional shape, three-dimensional shape, grain size, average particle size, hardness, friability, agglomeration, or any combination thereof. As illustrated, the coated abrasive 700 can include a first type of abrasive particulate 705 having a generally pyramidal shape and a second type of abrasive particulate 706 having a generally triangular two-dimensional shape. The coated abrasive 700 can include different amounts of the first type and second type of abrasive particulates 705 and 706. It will be appreciated that the coated abrasive may not necessarily include different types of shaped abrasive particles, and can consist essentially of a single type of shaped abrasive particle. As will be appreciated, the shaped abrasive particles of the embodiments herein can be incorporated into various fixed abrasives (e.g., bonded abrasives, coated abrasive, non-woven abrasives, thin wheels, cut-off wheels, reinforced abrasive articles, and the like), including in the form of blends, which may include different types of shaped abrasive particles, secondary particles, and the like.

After sufficiently forming the make coat 703 with the particulates 705-707 contained therein, the size coat 704 can be formed to overlie and bond the abrasive particulate material 705 in place. The size coat 704 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 8:
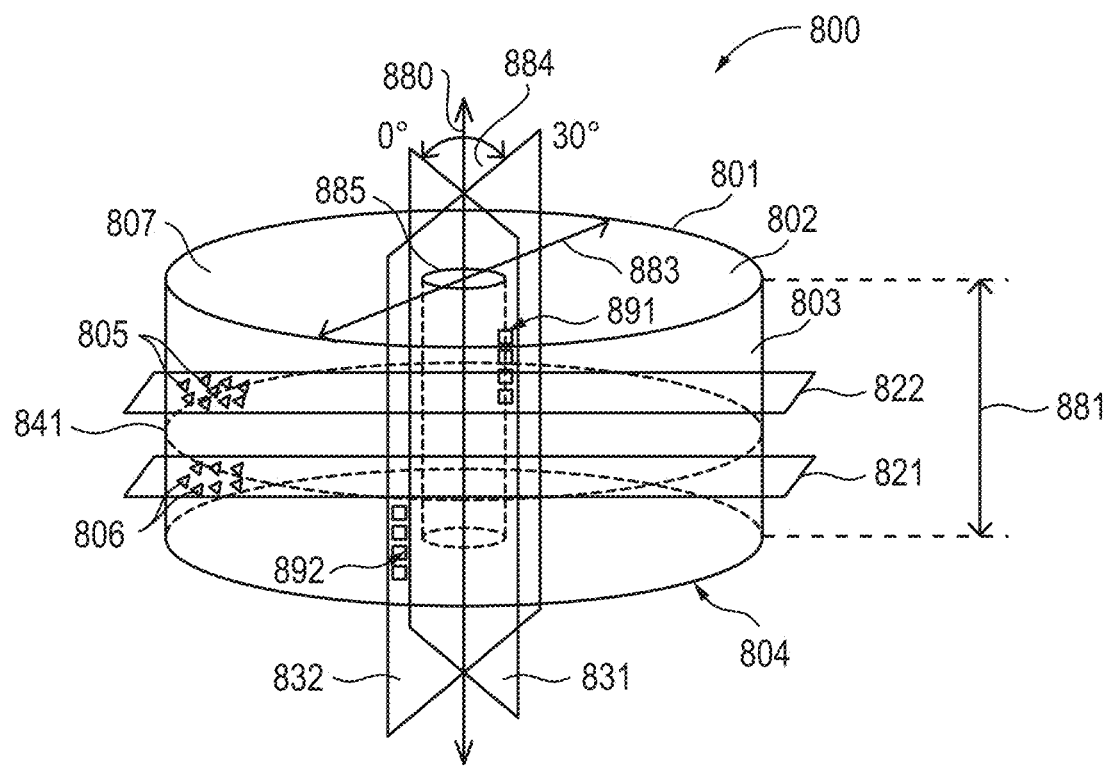
FIG. 8 includes a cross-sectional illustration of a bonded abrasive article incorporating the abrasive particulate in accordance with an embodiment.

FIG. 8 includes a perspective view illustration of a fixed abrasive article in accordance with an embodiment. As illustrated, the fixed abrasive article 800 can have a body 801 of a generally cylindrical shape including an upper surface 802, a bottom surface 804, and a side surface 803 extending between the upper surface 802 and bottom surface 804. It will be appreciated that the fixed abrasive article of FIG. 8 is a non-limiting example, and other shapes of the body may be utilized including, but not limited to, conical, cup-shaped, depressed center wheels (e.g., T42), and the like. Finally, as further illustrated, the body 801 can include a central opening 885 which may be configured to accept an arbor or shaft for mounting of the body 101 on a machine configured to rotate the body 101 and facilitate a material removal operation.

The fixed abrasive article 800 can have a body 801 including abrasive particles, including for example, the groups of abrasive particles 805 and 806, contained within the volume of the body 801. The groups of abrasive particles 805 and 806 may be contained within the three-dimensional volume of the body 801 by a bond material 807 that can extend throughout the three-dimensional volume of the body 801. In accordance with an embodiment, the bond material 807 can include materials such as vitreous, polycrystalline, monocrystalline, organic (e.g., resin), metal, metal alloys, and a combination thereof.

In a particular embodiment, the groups of abrasive particles 805 and 806 may be encapsulated within the bond material 807. As used herein, "encapsulated" refers to a condition whereby at least one of the abrasive particles is fully surrounded by a homogenous, or generally homogenous, composition of bond material. In an embodiment, an abrasive particle encapsulated within a bond material may be fully surrounded by a homogenous composition. More particularly, the encapsulated abrasive particle may be fully surrounded by a composition essentially free of discernable strati associated with, for example, layering. In a particular embodiment, a majority of the abrasive particles can be encapsulated within the bond material 807. In a more particular embodiment, all of the abrasive particles can be encapsulated within the bond material 807.

At least one of the groups of abrasive particle 805 and 806 may include the abrasive particulates of the embodiments herein. The fixed abrasive article 800 can include a combination or blend of various types of particulates, including one or more types of abrasive particles, such as primary and secondary types of abrasive particles. Primary and secondary types may refer to the content of the abrasive particles within the body of the fixed abrasive article, wherein the primary type abrasive particles are present in a higher content than the secondary type of abrasive particles. In other instances, the distinction between primary and secondary types of abrasive particles may be based upon the position of the abrasive particle within the body, wherein the primary abrasive particles may be positioned to conduct an initial stage of material removal or conduct the majority of material removal compared to the secondary abrasive particles. In still other instances, the distinction between primary and secondary abrasive particles may pertain to the abrasive nature (e.g., hardness, friability, fracture mechanics, etc.) of the abrasive particles, wherein the abrasive nature of the primary particles is typically more robust as compared to the secondary type of abrasive particles. Some suitable examples of abrasive particles that may be considered as a secondary type of abrasive particle include diluent particles, agglomerated particles, unagglomerated particles, naturally occurring materials (e.g., minerals), synthetic materials, and a combination thereof.

In certain instances, the fixed abrasive article 800 can include a particular content of abrasive particles within the body 801 that may facilitate suitable material removal operations. For example, the body 801 can include a content of abrasive particles of at least 0.5 vol % and not greater than 60 vol % for a total volume of the body 801, such as at least 1 vol % and not greater than 45 vol %, or even within a range of at least 5 vol % and not greater than 40 vol %.

Furthermore, the body 801 of the fixed abrasive article 800 can include a particular content of bond material 807 that may facilitate suitable operation of the fixed abrasive article 800. For example, the body 801 can include a content of bond material 807 within a range including at least 0.5 vol % and not greater than 80 vol %, such as within a range of at least 0.5 vol % and not greater than 50 vol %, or even with a range of at least 1 vol % to not greater than 40 vol %.

In certain instances, the fixed abrasive article can have a body 801 including a content of porosity. The porosity can extend throughout at least a portion of the entire volume of the body 101, and in certain instances, may extend substantially uniformly throughout the entire volume of the body 801. For example, the porosity can include closed porosity or open porosity. Closed porosity can be in the form of discrete pores that are isolated from each other by bond material and/or abrasive particles. Such closed porosity may be formed by pore formers. In other instances, the porosity may be open porosity defining an interconnected network of channels extending throughout at least a portion of the three-dimensional volume of the body 801. It will be appreciated that the body 801 may include a combination of closed porosity and open porosity.

In accordance with an embodiment, the fixed abrasive article can have a body 801 including a particular content of porosity that can facilitate suitable material removal operations. For example, the body 801 can have a porosity within a range including at least 0.5 vol % and not greater than 80 vol %, such as at least 1 vol % and not greater than 70 vol %, or even at least 5 vol % and not greater than 50 vol %.

In accordance with another embodiment, it will be appreciated that the fixed abrasive article 800 can include a body 801 including certain additives that may facilitate certain grinding operations. For example, the body 801 can include additives such as fillers, grinding aids, pore inducers, hollow materials, catalysts, coupling agents, curants, antistatic agents, suspending agents, anti-loading agents, lubricants, wetting agents, dyes, fillers, viscosity modifiers, dispersants, defoamers, and a combination thereof.

The body 801 can have a diameter 883, which may be varied according to the desired material removal operation.

The diameter can refer to the maximum diameter of the body, particularly in those cases where the body 801 has a conical or cup-shaped contour. Moreover, the body 801 can have a particular thickness 881 extending along the side surface 803 between the upper surface 802 and the bottom surface 804 along the axial axis 880. The body 801 can have a thickness suitable for the intended application. In accordance with an embodiment, the body 101 may have a particular relationship between the diameter 883 and thickness 881, defining a ratio of diameter:thickness that may be suitable for certain material removal operations. For example, the body 101 can have a ratio of diameter:thickness of at least 10:1, such as at least 15:1, at least 20:1, at least 50:1, or even at least 100:1. It will be appreciated that the body may have a ratio of diameter:thickness of not greater than 10,000:1 or not greater than 1000:1.

The fixed abrasive article 800 may include one or more optional reinforcing members 841. In particular instances, the reinforcing material 841 can extend for a majority of the entire width (e.g., the diameter 883) of the body 801. However, in other instances, the reinforcing member 841 may extend for only a fraction of the entire width (e.g., diameter 183) of the body 101. In accordance with an embodiment, the reinforcing member 841 can include a material such as a woven material, a nonwoven material, a composite material, a laminated material, a monolithic material, a natural material, a synthetic material, and a combination thereof. More particularly, in certain instances, the reinforcing material 841 can include a material such as a monocrystalline material, a polycrystalline material, a vitreous material, an amorphous material, a glass (e.g., a glass fiber), a ceramic, a metal, an organic material, an inorganic material, and a combination thereof. In particular instances, the reinforcing material 841 may include fiberglass, and may be formed essentially from fiberglass.

As further illustrated, the body 801 can include certain axes and planes defining the three-dimensional volume of the body 801. For example, the body 801 can include an axial axis 880. As further illustrated along the axial axis 880, the body 801 can include a first axial plane 831 extending along the axial axis 880 and through a particular diameter of the body 801 at a particular angular orientation, designated herein as 0°. The body 801 can further include a second axial plane 832 distinct from the first axial plane 831. The second axial plane 832 can extend along the axial axis 880 and through a diameter of the body 801 at an angular position, as designated by example herein as 30°. The first and second axial planes 831 and 832 of the body 801 may define particular axial collections of abrasive particles within the body 801 including, for example, the axial collection of abrasive particles 891 within the axial plane 831 and the axial collection of abrasive particles 892 within the axial plane 832. Furthermore, the axial planes of the body 101 may define sectors there between, including for example, sector 884 defined as the region between the axial planes 831 and 832 within the body 801. The sectors can include a particular group of abrasive particles that may facilitate improved material removal operations. Reference herein to features of portions of abrasive particles within the body, including for example, abrasive particles within axial planes will also be relevant to groups of abrasive particles contained within one or more sectors of the body.

As further illustrated, the body 101 can include a first radial plane 821 extending along a plane that is substantially parallel to the upper surface 802 and/or bottom surface 804 at a particular axial location along the axial axis 880. The body can further include a second radial plane 822, which can extend in a substantially parallel manner to the upper surface 802 and/or bottom surface 804 at a particular axial location along the axial axis 880. The first radial plane 821 and second radial plane 822 can be separated from each other within the body 801, and more particularly, the first radial plane 821 and second radial plane 822 can be axially separated from each other. The first and second radial planes 821 and 822 may include one or more particular groups of abrasive particles including, for example, the group of abrasive particles 806 of the first radial plane 821 and the group of abrasive particles 805 of the second radial plane 822, which may have certain features relative to each other that may facilitate improved grinding performance. The abrasive particles contained in the body 801 may have a controlled placement and/or orientation within the volume of the abrasive article.

Figure 9:
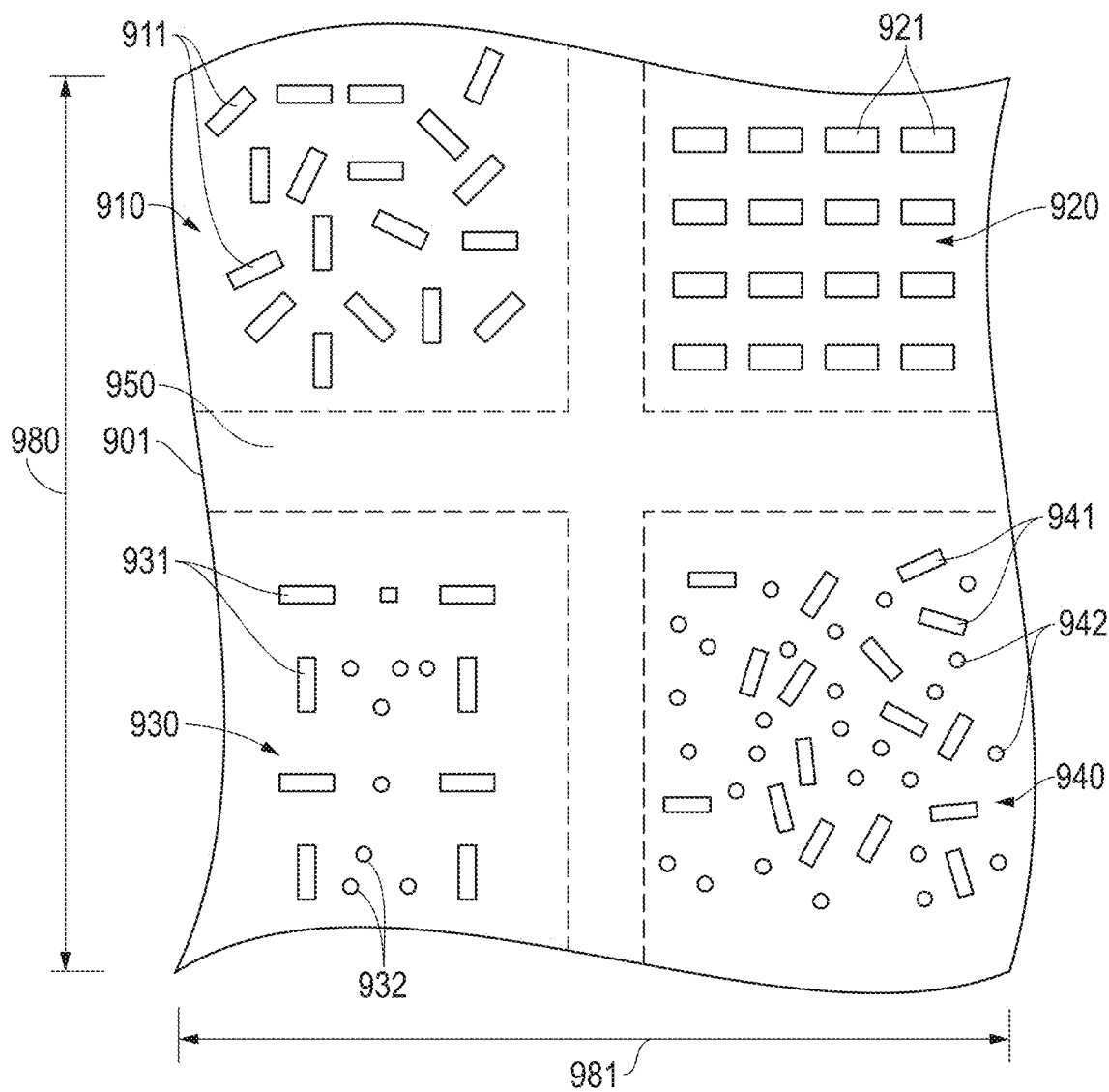
FIG. 9 includes a top-view illustration of a portion of a coated abrasive article according to an embodiment.

FIG. 9 includes a top view of a portion of a coated abrasive according to an embodiment. The coated abrasive 900 can include a plurality of regions, such as a first region 910, a second region 920, a third region 930 and a fourth region 940. Each of the regions 910, 920, 930, and 940 can be separated by a channel region 950, wherein the channel region 950 defines a region the backing that is free of particles. The channel region 950 can have any size and shape and may be particularly useful for removing swarf and improved grinding operations. The channel region 950 may have a length (i.e., longest dimension) and width (i.e., shortest dimension perpendicular to the length) that is greater than the average spacing between immediately adjacent abrasive particles within any of the regions 910, 920, 930, and 940. The channel region 950 is an optional feature for any of the embodiments herein.

As further illustrated, the first region 910 can include a group of abrasive particulates 911, which may be shaped abrasive particles that can have a generally random rotational orientation with respect to each other. The group of abrasive particulates 911 can be arranged in a random distribution relative to each other, such that there is no discernable short-range or long-range order with regard to the placement of the abrasive particulates 911. Notably, the group of abrasive particulates 911 can be substantially homogenously distributed within the first region 910, such that the formation of clumps (two or more particles in contact with each other) is limited. It will be appreciated that the grain weight of the group of abrasive particulates 911 in the first region 910 can be controlled based on the intended application of the coated abrasive.

The second region 920 can include a group of abrasive particulates 921 that may include shaped abrasive particles arranged in a controlled distribution relative to each other. Moreover, the group of abrasive particulates 921 can have a regular and controlled rotational orientation relative to each other. As illustrated, the group of abrasive particulates 921 can have generally the same rotational orientation as defined by the same rotational angle on the backing of the coated abrasive 901. The group of abrasive particulates 921 can be substantially homogenously distributed within the second region 920, such that the formation of clumps (two or more particles in contact with each other) is limited. It will be appreciated that the grain weight of the group of abrasive particulates 921 in the second region 920 can be controlled based on the intended application of the coated abrasive.

The third region 930 can include a plurality of groups of abrasive particulates that can include shaped abrasive particles 921 and secondary particles 932. The group of shaped abrasive particles 931 and secondary particles 932 can be arranged in a controlled distribution relative to each other.

Moreover, the group of shaped abrasive particles 931 can have a regular and controlled rotational orientation relative to each other. As illustrated, the group of shaped abrasive particles 931 can have generally one of two types of rotational orientations on the backing of the coated abrasive 901. Notably, the group of shaped abrasive particles 931 and secondary particles 932 can be substantially homogenously distributed within the third region 930, such that the formation of clumps (two or more particles in contact with each other) is limited. It will be appreciated that the grain weight of the group of shaped abrasive particles 931 and secondary particles 932 in the third region 930 can be controlled based on the intended application of the coated abrasive.

The fourth region 940 can include abrasive particulates including a group of shaped abrasive particles 941 and secondary particles 942 having a generally random distribution with respect to each other. Additionally, the group of shaped abrasive particles 941 can have a random rotational orientation with respect to each other. The group of shaped abrasive particles 941 and secondary particles 942 can be arranged in a random distribution relative to each other, such that there is no discernable short-range or long-range order. Notably, the group of shaped abrasive particles 941 and the secondary particles 942 can be substantially homogenously distributed within the fourth region 940, such that the formation of clumps (two or more particles in contact with each other) is limited. It will be appreciated that the grain weight of the group of shaped abrasive particles 941 and secondary particles 942 in the fourth region 910 can be controlled based on the intended application of the coated abrasive.

As illustrated in FIG. 9, the coated abrasive article 900 can include different regions 910, 920, 930, and 940, each of which can include different groups of abrasive particulates according to the embodiments herein. The coated abrasive article 900 is intended to illustrate the different types of groupings, arrangements and distributions of particles that may be created using the systems and processes of the embodiments herein. The illustration is not intended to be limited to only those groupings of particles and it will be appreciated that coated abrasive articles can be made including only one region as illustrated in FIG. 9. It will also be understood that other coated abrasive articles can be made including a different combination or arrangement of one or more of the regions illustrated in FIG. 9.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive particulate comprising a body and a dopant contained in the body, wherein the dopant is non-homogenously distributed throughout the body and wherein the body comprises a maximum normalized dopant content difference of at least 35%.

Embodiment 2. An abrasive particulate comprising a body and a dopant contained in the body, wherein the dopant is non-homogenously distributed throughout the body and defines the following regions in the body:
an enriched region abutting an exterior surface of the body and having a first dopant content;
a doped region in a central region of the body and different than the enriched region, the doped region having a second dopant content; and
a depletion region between the enriched region and doped region, the depletion region defining a decrease in the normalized content of the dopant of greater than 0.04%/nm.

Embodiment 3. The abrasive particulate of Embodiment 2, wherein the body comprises a maximum normalized dopant content difference of at least 35%.

Embodiment 4. The abrasive particulate of any one of Embodiments 1 and 3, wherein the maximum normalized dopant content difference is at least 36%, or at least 37%, or at least 38%, or at least 40%, or at least 42%, or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%.

Embodiment 5. The abrasive particulate of any one of Embodiments 1 and 3, wherein the maximum normalized dopant content difference is not greater than 99%, or not greater than 95%, or not greater than 90%, or not greater than 85%, or not greater than 80%, or not greater than 75%, or not greater than 70%, or not greater than 65%, or not greater than 60%.

Embodiment 6. The abrasive particulate of Embodiment 1, wherein the dopant is non-homogeneously distributed throughout the body and defines the following regions in the body; an enriched region abutting an exterior surface of the body and having a first dopant content; a doped region in a central region of the body and different than the enriched region, the doped region having a second dopant content; and a depletion region between the enriched region and doped region, the depletion region defining a decrease in the normalized content of the dopant of greater than 0.04%/nm.

Embodiment 7. The abrasive particulate of any one of Embodiments 2 and 6, wherein the decrease in the normalized content of the dopant in the depletion region is at least 0.04%/nm, or at least 0.05%/nm, or at least 0.06%/nm, or at least 0.08%/nm, or at least 0.10%/nm, or at least 0.22%/nm, or at least 0.23%/nm, or at least 0.25%/nm, or at least 0.26%/nm, or at least 0.27%/nm, or at least 0.28%/nm, or at least 0.29%/nm, or at least 0.30%/nm.

Embodiment 8. The abrasive particulate of any one of Embodiments 2 and 6, wherein the decrease in the normalized content of the dopant in the depletion region is not greater than 0.5%/nm, or not greater than 0.48%/nm, or not greater than 0.45%/nm, or not greater than 0.43%/nm, or not greater than 0.40%/nm, or not greater than 0.35%/nm.

Embodiment 9. The abrasive particulate of any one of Embodiments 2 and 6, wherein the decrease in the dopant content in the depletion region is greater than the decrease of dopant content in the enriched region or doped region.

Embodiment 10. The abrasive particulate of any one of Embodiments 2 and 6, wherein the decrease in the normalized dopant content in the depletion region is at least 2 times greater than a decrease in the normalized dopant content in the enriched region or at least 3 times greater or at least 4 times greater or at least 5 times greater than a maximum normalized change in the dopant content in the enriched region.

Embodiment 11. The abrasive particulate of any one of Embodiments 2 and 6, wherein the decrease in the normalized dopant content in the depletion region is at least 2 times greater than a decrease of the normalized dopant content in the doped region or at least 3 times greater or at least 4 times greater or at least 5 times greater than a maximum normalized change in the dopant content in the doped region.

Embodiment 12. The abrasive particulate of any one of Embodiments 2 and 6, wherein the beginning of the depletion region is closer to the exterior surface of the body than a central point of the body.

Embodiment 13. The abrasive particulate of any one of Embodiments 2 and 6, wherein the end of the depletion region is closer to the exterior surface of the body than a central point of the body.

Embodiment 14. The abrasive particulate of any one of Embodiments 2 and 6, wherein the enriched region extends for not greater than 3000 nm into the body from the exterior surface of the body or not greater than 2800 nm, or not greater than 2500 nm, or not greater than 2300 nm, or not greater than 2000 nm, or not greater than 1800 nm, or not greater than 1600 nm, or not greater than 1400 nm, or not greater than 1200 nm, or not greater than 1000 nm, or not greater than 900 nm, or not greater than 800 nm, or not greater than 700 nm, or not greater than 600 nm.

Embodiment 15. The abrasive particulate of any one of Embodiments 2 and 6, wherein the enriched region extends for at least 1 nm into the body from the exterior surface of the body.

Embodiment 16. The abrasive particulate of any one of Embodiments 2 and 6, wherein the first dopant content is the maximum content of dopant in the body (Cmax) and the second dopant content is the minimum content of the dopant in the body (Cmin).

Embodiment 17. The abrasive particulate of Embodiment 16, wherein the maximum content (Cmax) of the dopant in the body defines the start of the depletion region at the boundary of the enriched region and the depletion region.

Embodiment 18. The abrasive particulate of any one of Embodiments 2 and 6, wherein the doped region extends for a greater length in the body than the enriched region.

Embodiment 19. The abrasive particulate of any one of Embodiments 2 and 6, wherein the doped region extends for a greater length in the body than the depletion region.

Embodiment 20. The abrasive particulate of any one of Embodiments 2 and 6, wherein the depletion region extends for a greater length in the body than the doped region.

Embodiment 21. The abrasive particulate of any one of Embodiments 2 and 6, wherein the enriched region extends for a greater length in the body than the depletion region.

Embodiment 22. The abrasive particulate of any one of Embodiments 2 and 6, wherein the doped region extends for a length of at least 1000 nm in the body, or at least 1200 nm, or at least 1500 nm, or at least 2000 nm, or at least 3000 nm, or at least 4000 nm.

Embodiment 23. The abrasive particulate of any one of Embodiments 2 and 6, wherein the doped region comprises a change in the normalized content of the dopant of not greater than 0.04%/nm, or not greater than 0.03%/nm, or not greater than 0.02%/nm, or not greater than 0.01%/nm.

Embodiment 24. The abrasive particulate of any one of Embodiments 2 and 6, wherein the doped region comprises a change in the normalized content of the dopant of at least 0.001%/nm, or at least 0.005%/nm, or at least 0.008%/nm, or at least 0.01%/nm.

Embodiment 25. The abrasive particulate of any one of Embodiments 2 and 6, wherein the enriched region comprises a change in the normalized content of the dopant of not greater than 0.16%/nm, or not greater than 0.15%/nm, or not greater than 0.13%/nm, or not greater than 0.10%/nm, or not greater than 0.080%/nm, or not greater than 0.060%/nm.

Embodiment 26. The abrasive particulate of any one of Embodiments 2 and 6, wherein the enriched region comprises a change in the normalized content of the dopant of at least 0.001%/nm or at least 0.005%/nm or at least 0.007%/nm.

Embodiment 27. The abrasive particulate of any one of Embodiments 1 and 2, wherein the body comprises an oxide or wherein the body comprises alumina or wherein the body comprises alpha alumina or wherein the body comprises polycrystalline alpha alumina.

Embodiment 28. The abrasive particulate of any one of Embodiments 1 and 2, wherein the body consists essentially of an oxide and the dopant.

Embodiment 29. The abrasive particulate of any one of Embodiments 1 and 2, wherein the body consists essentially of alpha alumina and the dopant.

Embodiment 30. The abrasive particulate of any one of Embodiments 1 and 2, wherein the body comprises at least 60 wt % alumina for a total weight of the body, or at least 70 wt % or at least 80 wt %, or at least 90 wt % alumina.

Embodiment 31. The abrasive particulate of any one of Embodiments 1 and 2, wherein the body comprises not greater than 99 wt % alumina for a total weight of the body or not greater than 98 wt %, or not greater than 97 wt %, or not greater than 96 wt %, or not greater than 95 wt %, or not greater than 94 wt %, or not greater than 93 wt %, or not greater than 92 wt %, or not greater than 91 wt %, or not greater than 90 wt %.

Embodiment 32. The abrasive particulate of any one of Embodiments 1 and 2, wherein the body includes crystallites of the oxide material, and wherein the crystallites have an average grain size of not greater than 100 microns, or not greater than 80 microns, or not greater than 50 microns, or not greater than 30 microns, or not greater than 20 microns, or not greater than 10 microns, or not greater than 1 micron, or not greater than 0.9 microns, or not greater than 0.8 microns, or not greater than 0.7 microns, or not greater than 0.6 microns.

Embodiment 33. The abrasive particulate of Embodiment 32, wherein the average grain size is at least 0.01 microns, or at least about 0.05 microns.

Embodiment 34. The abrasive particulate of any one of Embodiments 1 and 2, wherein abrasive particle comprises a mean particle size of not greater than 5000 microns and at least 0.1 microns.

Embodiment 35. The abrasive particulate of any one of Embodiments 1 and 2, wherein the abrasive particle comprises a porosity of not greater than 5 vol % for a total volume of the body, or not greater than 4 vol %, or not greater than 3 vol %, or not greater than 2 vol %, or not greater than 1 vol %.

Embodiment 36. The abrasive particulate of any one of Embodiments 1 and 2, wherein the dopant includes an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, cerium, neodymium, gadolinium. europium, silicon, phosphorous or any combination thereof.

Embodiment 37. The abrasive particulate of any one of Embodiments 1 and 2, wherein the dopant comprises magnesium.

Embodiment 38. The abrasive particulate of any one of Embodiments 1 and 2, wherein the dopant consists essentially of magnesium or magnesium oxide.

Embodiment 39. The abrasive particulate of any one of Embodiments 1 and 2, wherein the body consists essentially of alpha alumina and a dopant of magnesium or magnesium oxide.

Embodiment 40. The abrasive particulate of any one of Embodiments 1 and 2, wherein the dopant is primarily located at the crystalline grain boundaries between the crystalline grains of the oxide.

Embodiment 41. The abrasive particulate of any one of Embodiments 1 and 2, wherein the body comprises not greater than 18 wt % dopant for a total weight of the body or not greater than 16 wt % or not greater than 14 wt % or not greater than 12 wt % or not greater than 10 wt %, or not greater than 8 wt %, or not greater than 6 wt %, or not greater than 5 wt %, or not greater than 4 wt %, or not greater than 3 wt %, dopant for a total weight of the body.

Embodiment 42. The abrasive particulate of any one of Embodiments 1 and 2, wherein the body comprises at least 0.5 wt % dopant for a total weight of the body or at least 1 wt %, or at least 2 wt %, or at least 3 wt % dopant.

Embodiment 43. The abrasive particulate of any one of Embodiments 1 and 2, wherein the body is an exploded abrasive particle.

Embodiment 44. The abrasive particulate of any one of Embodiments 1 and 2, wherein the body comprises an average radius of curvature of not greater than 115 microns, or not greater than 110 microns, or not greater than 105 microns, or not greater than 100 microns, or not greater than 95 microns, and wherein the body comprises a specific length within a range of at least 1.8 to not greater than 4.0.

Embodiment 45. The abrasive particulate of any one of Embodiments 1 and 2, wherein the body is a shaped abrasive particle having a first surface, a second surface, and a side surface extending between the first surface and second combination of polygons shapes, shapes including a central region and a plurality of arms (e.g., at least three arms) extending from a central region (e.g., star shapes), and a combination thereof.

Embodiment 46. A fixed abrasive article including the abrasive surface, and wherein the first surface has a two-dimensional shape selected from the group consisting regular polygons, irregular polygons, irregular polygons including arcuate or curved sides or portions of sides, ellipsoids, numerals, Greek alphabet characters, Latin alphabet characters, Russian alphabet characters, Kanji characters, complex shapes having a particulate of any one of Embodiments 1 and 2.

Embodiment 47. The fixed abrasive article of Embodiment 46, wherein the abrasive article includes a coated abrasive, bonded abrasive, non-woven abrasive, or any combination thereof.

Embodiment 48. The fixed abrasive article of Embodiment 46, wherein the abrasive particulate includes a controlled placement or orientation within the body of the fixed abrasive article.

Embodiment 49. The fixed abrasive article of Embodiment 46, further comprising a plurality of abrasive particles, wherein the plurality of abrasive particles includes a plurality of abrasive particulates.

Embodiment 50. The fixed abrasive article of Embodiment 49, wherein the plurality of abrasive particles includes a blend of abrasive particles, the blend including a first type consisting of the plurality of abrasive particulates and a second type different from the first type by at least one abrasive characteristic selected from the group consisting of average particle size, two-dimensional shape, three-dimensional shape, composition, hardness, toughness, friability, density, grain size, agglomeration state, or any combination thereof.

Embodiment 51. A plurality of abrasive particles including the abrasive particulate of any one of Embodiments 1 and 2.

Embodiment 52. The plurality of abrasive particulates of Embodiment 51, wherein the plurality of abrasive particles includes a plurality of abrasive particulates.

Embodiment 53. The plurality of abrasive particulates of Embodiment 51, wherein at least 60% of the abrasive particles are abrasive particulates, each of the abrasive particulates having a dopant non-homogenously distributed throughout the body or at least 70%, or at least 80%, or at least 90%, or at least 95%.

Embodiment 54. A method of forming an abrasive particulate comprising:
comminuting a particulate precursor;
impregnating the particulate precursor; and
conducting an enriching process and selectively depositing the dopant in higher concentrations in an enriched region of the body of the abrasive particulate compared to a doped region associated with a central region of the body.

Embodiment 55. The method of Embodiment 54, wherein the enriching process includes controlling at least one of time, temperature, dopant content, dopant concentration, pressure, phase of the dopant, viscosity of the dopant or any combination thereof.

Embodiment 56. The method of Embodiment 54, wherein the enriching process is conducted after the impregnation process and includes depositing nanoparticles of the dopant on an exterior surfaces of the impregnated particulate precursor.

Embodiment 57. The method of Embodiment 54, wherein the enriching process includes at least one process selected from the group consisting of selective deposition, dipping, coating, soaking, mixing, heating, drying, cooling, or any combination thereof.

Embodiment 58. The method of Embodiment 54, wherein the enriching process is conducted simultaneously with impregnating.

Embodiment 59. The method of Embodiment 54, wherein the enriching process is conducted after impregnating.

Embodiment 60. The method of Embodiment 54, wherein the body comprises a maximum normalized dopant content difference of at least 35%, or at least 36%, or at least 37%, or at least 38%, or at least 40%, or at least 42% or at least 44%, or at least 46%, or at least 48%, or at least 50%, or at least 52%, or at least 54%, or at least 56%, or at least 58%, or at least 60%, or at least 62%, or at least 64%, or at least 66%, or at least 68%, or at least 70%.

Embodiment 61. The method of Embodiment 60, wherein the maximum normalized dopant content difference is not greater than 99%, or not greater than 95%, or not greater than 90%, or not greater than 85%, or not greater than 80%, or not greater than 75%, or not greater than 70%, or not greater than 65%, or not greater than 60%.

Embodiment 62. The method of Embodiment 54, wherein the dopant is non-homogenously distributed throughout the body and defines the following regions in the body: an enriched region abutting an exterior surface of the body and having a first dopant content; a doped region in a central region of the body and different than the enriched region, the doped region having a second dopant content; and a depletion region between the enriched region and doped region, the depletion region defining a decrease in the normalized content of the dopant of greater than 0.04%/nm.

Embodiment 63. The method of Embodiment 62, wherein the decrease in the normalized content of the dopant in the depletion region is at least 0.04%/nm, or at least 0.05%/nm, or at least 0.06%/nm, or at least 0.08%/nm, or at least 0.10%/nm, or at least 0.20%/nm, or at least 0.22%/nm, or at least 0.23%/nm, or at least 0.25%/nm, or at least 0.26%/nm, or at least 0.27%/nm, or at least 0.28%/nm, or at least 0.29%/nm, or at least 0.30%/nm.

Embodiment 64. The method of Embodiment 63, wherein the decrease in the normalized content of the dopant in the depletion region is not greater than 0.5%/nm, or not greater than 0.48%/nm, or not greater than 0.45%/nm, or not greater than 0.43%/nm, or not greater than 0.40%/nm, or not greater than 0.35%/nm.

Embodiment 65. The method of Embodiment 54, wherein the change in dopant content in the depletion region is greater than the change of dopant content in the enriched region or doped region.

Embodiment 66. The method of Embodiment 54, wherein the maximum normalized change in dopant content in the depletion region is at least 2 times greater than a maximum normalized change in the dopant content in the enriched region or at least 3 times greater or at least 4 times greater or at least 5 times greater than a maximum normalized change in the dopant content in the enriched region.

Embodiment 67. The method of Embodiment 54, wherein the maximum normalized change in dopant content in the depletion region is at least 2 times greater than a maximum normalized change in the dopant content in the doped region or at least 3 times greater or at least 4 times greater or at least 5 times greater than a maximum normalized change in the dopant content in the doped region.

Embodiment 68. The method of Embodiment 54, wherein the beginning of the depletion region is closer to the exterior surface of the body than a central point of the body.

Embodiment 69. The method of Embodiment 54, wherein the end of the depletion region is closer to the exterior surface of the body than a central point of the body.

Embodiment 70. The method of Embodiment 54, wherein the enriched region extends for not greater than 3000 nm into the body from the exterior surface of the body or not greater than 2800 nm, or not greater than 2500 nm, or not greater than 2300 nm, or not greater than 2000 nm, or not greater than 1800 nm, or not greater than 1600 nm, or not greater than 1400 nm, or not greater than 1200 nm, or not greater than 1000 nm, or not greater than 900 nm, or not greater than 800 nm, or not greater than 700 nm, or not greater than 600 nm, or not greater than 500 nm, or not greater than 400 nm, or not greater than 350 nm, or not greater than 300 nm, or not greater than 250 nm, or not greater than 200 nm, or not greater than 150 nm, or not greater than 100 nm.

Embodiment 71. The method of Embodiment 54, wherein the enriched region extends for at least 1 nm into the body from the exterior surface of the body.

Embodiment 72. The method of Embodiment 54, wherein the first dopant content is the maximum content of dopant in the body (Cmax) and the second dopant content is the minimum content of the dopant in the body (Cmin).

Embodiment 73. The method of Embodiment 54, wherein the doped region comprises a change in the normalized content of the dopant of not greater than 0.04%/nm, or not greater than 0.03%/nm, or not greater than 0.02%/nm, or not greater than 0.01%/nm.

Embodiment 74. The method of Embodiment 54, wherein the doped region comprises a change in the normalized content of the dopant of at least 0.001%/nm, or at least 0.005%/nm, or at least 0.008%/nm, or at least 0.01%/nm.

Embodiment 75. The method of Embodiment 54, wherein the enriched region comprises a change in the normalized content of the dopant of not greater than 0.16%/nm, or not greater than 0.15%/nm, or not greater than 0.13%/nm, or not greater than 0.10%/nm, or not greater than 0.080%/nm, or not greater than 0.060%/nm.

Embodiment 76. The method of Embodiment 54, wherein the enriched region comprises a change in the normalized content of the dopant of at least 0.001%/nm, or at least 0.005%/nm, or at least 0.007%/nm.

Embodiment 77. The method of Embodiment 54, wherein the body comprises an oxide or wherein the body comprises alumina or wherein the body comprises alpha alumina or wherein the body comprises polycrystalline alpha alumina.

Embodiment 78. The method of Embodiment 77, wherein the body consists essentially of alpha alumina and the dopant.

Embodiment 79. The method of Embodiment 54, wherein the body comprises at least one of:
a) at least 60 wt % alumina and not greater than 99 wt % alumina for a total weight of the body;
b) crystallites of a first phase comprising an oxide and having an average grain size of at least 0.01 microns and not greater than 100 microns;
c) a mean particle size of not greater than 5000 microns and at least 0.1 microns;
d) a porosity of not greater than 5 vol % for a total volume of the body;
e) a dopant including an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, cerium, neodymium, gadolinium. europium, silicon, phosphorous or any combination thereof.
f) the dopant primarily located at the crystalline grain boundaries between the crystalline grains of the oxide;
g) at least 0.5 wt % and not greater than 18 wt % dopant for a total weight of the body;
h) wherein the body is an exploded abrasive particle;
i) an average radius of curvature of not greater than 115 microns;
j) a shaped abrasive particle; and
k) any combination thereof.

Example 1

A first sample of an abrasive particulate (Sample S1) was made according to the following procedures. An explosively comminuted, but not sintered alumina precursor particulate was made according to the teachings of U.S. Pat. No. 6,083,622.

The obtained raw material had a particle size of 850-1000 microns and a pore volume of about 0.45 cm$^3$/g. The pore volume was measured using BET, and used to determine the saturation conditions for the raw material powder.

An amount of 25 g of the raw material powder was spray impregnated with an aqueous super saturated magnesium nitrate hexahydrate salt (Mg-salt) solution (67 wt % Mg-salt based on the total amount of the Mg-salt solution) to correspond to 100% pore volume. The mixture was dried for at least 8 hours at 95° C. under air and calcined at 800° C. for 10 minutes. After the impregnation, a further enriching process was conducted, wherein a 1 wt % colloidal magnesium hydroxide containing solution (MagSol from Nyacol) having a particle size between 150 nm to 250 nm was deposited by spray impregnation on the exterior surfaces of the dried and impregnated precursor particulate. The obtained particles were dried and sintered at a temperature between 1250-1280° C.

The abrasive particulate of Sample S1 was sized and analyzed via Time of Flight Secondary Ion Mass Spectrometry (TOF-SIMS) to determine the dopant concentration based on maximum intensity normalization versus penetration depth as previously described herein, and also illustrated in FIG. 10 and Table 1 below. The TOF-SIMS measured the magnesium present in the particles as $Mg^+$, which was converted by calculation to magnesium oxide. Sample S1 had a maximum normalized dopant content difference of approximately 48% and a decrease in the normalized content of the dopant in the depletion region of approximately 0.28%/nm. The average total magnesium oxide doping content for Sample S1 was about 5 wt % based on the total weight of the particles.

Example 2

Another sample, Sample S2, was formed using the same raw materials as Sample S1 in Example 1. Sample 2 was also subjected to an enriching process. After the enriching process, Example S2 was sintered at a temperature of about 1250° C. The average total MgO dopant content for Sample S2 was about 8 wt % based on the total weight of the abrasive particulate.

As illustrated in FIG. 10 and Table 1, Sample S2 had a maximum normalized dopant content difference of approximately 62% and a decrease in the normalized content of the dopant in the depletion region of approximately 0.06%/nm.

The average total MgO dopant content for Sample S2 was about 8 wt % based on the total weight of the abrasive particulate.

Example 3

Comparative sample CS1 was a commercially available and conventionally Mg-salt impregnated and sintered alumina abrasive particulate material (Cubitron II from 3M).

Sample CS1 was subjected to TOF-SIMS analysis the same way as conducted for samples S1 and S2, and illustrated in FIG. 10 and Table 1.

Sample CS1 had a maximum normalized Mg dopant content difference of approximately 26% and a decrease in the normalized content of the dopant of approximately 0.01%/nm.

A summary of the Cmax and Cmin values for Samples S1, S2, and CS1 and the calculated maximum normalized dopant content difference (Δ Intensity) and the change in the normalized content of the dopant in the depletion region (drop from $C_{max}$ to $C_{min}$ expressed in %/nm), can be seen in Table 1 below.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive particulate comprising a body and a dopant contained in the body, wherein the dopant includes magnesium oxide and is non-homogenously distributed throughout the body and defines the following regions in the body:
   an enriched region having a first dopant content, the enriched region starting at an exterior surface of the body and extending into the body and ending at a point of a maximum dopant content (Cmax), wherein the first dopant content increases from the exterior surface of the body to Cmax, and wherein Cmax is measurably displaced from the exterior surface of the body by an average depth of at least 10 nm as determined by TOF-SIMS;
   a doped region in a central region of the body and different than the enriched region, the doped region having a second dopant content;
   a depletion region between the enriched region and the doped region, the depletion region starting at Cmax and defining a decrease in the normalized content of the dopant of at least 0.04%/nm and not greater than 0.45%/nm; and
   wherein the body comprises a maximum normalized dopant content difference of at least 35%.

2. The abrasive particulate of claim 1, wherein a change of a dopant content in the depletion region is greater than a change of a dopant content in the enriched region or a change of a dopant content in the doped region.

3. The abrasive particulate of claim 1, wherein the decrease in the normalized content of dopant in the depletion region is at least 3 times greater than a decrease in the normalized dopant content in the doped region.

TABLE 1

|  | Distance $C_{max}$ [nm] | Distance $C_{min}$ [nm] | Distance $C_{max} - C_{min}$ [nm] | Intensity $C_{max}$ [%] | Intensity $C_{min}$ [%] | Δ Intensity [%] | Drop $C_{max} - C_{min}$ [%/nm] |
|---|---|---|---|---|---|---|---|
| S1 | 24.5 | 195.8 | 171.3 | 100 | 52.0 | 48.0 | 0.28 |
| S2 | 391.5 | 1394.9 | 1003.4 | 100 | 38.4 | 61.6 | 0.06 |
| CS1 | 24.5 | 2202.5 | 2178.0 | 100 | 74.0 | 26.0 | 0.01 |

4. The abrasive particulate of claim 1, wherein Cmax is measurably displaced from the exterior surface of the body by an average depth of at least 10 nm and not greater than 3000 nm.

5. The abrasive particulate of claim 4, wherein Cmax is measurably displaced from the exterior surface of the body by an average depth of at least 10 nm to not greater than 2000 nm.

6. The abrasive article of claim 5, wherein Cmax is measurably displaced from the exterior surface of the body by an average depth of at least 10 nm to not greater than 400 nm.

7. The abrasive particulate of claim 1, wherein the doped region extends for a greater length in the body than the enriched region.

8. The abrasive particulate of claim 1, wherein a decrease in the normalized dopant content of the dopant in the doped region is not greater than 0.03%/nm.

9. The abrasive particulate of claim 1, wherein the doped region extends for a greater length in the body than the depletion region.

10. The abrasive particulate of claim 1, wherein the doped region extends for a length of at least 3000 nm in the body.

11. The abrasive particulate of claim 1, wherein the body comprises alpha alumina and the dopant.

12. The abrasive particulate of claim 11, wherein the body consists essentially of alpha alumina and the dopant.

13. The abrasive particulate of claim 12, wherein the dopant consists essentially of magnesium oxide.

14. The abrasive particulate of claim 1, wherein the body comprises at least 1 wt % dopant and not greater than 14 wt % dopant based on the total weight of the body.

15. The abrasive particulate of claim 14, wherein the body comprises at least 4 wt % dopant and not greater than 10 wt % dopant based on the total weight of the body.

16. The abrasive particulate of claim 1, wherein the body is an exploded abrasive particle and has a radius of curvature of not greater than 115 microns.

17. The abrasive particulate of claim 1, wherein the abrasive particulate comprises a mean particle size of at least 0.1 microns and not greater than 5000 microns.

18. The abrasive particulate of claim 1, wherein the enriched region comprises a change in the normalized content of the dopant of at least 0.001%/nm.

19. The abrasive particulate of claim 18, wherein the enriched region comprises a change in the normalized content of the dopant of at least 0.001%/nm and not greater than 0.04%/nm.

20. The abrasive particulate of claim 1, wherein the enriched region extends for a greater length in the body than the depletion region.

* * * * *